(12) United States Patent
Doughty et al.

(10) Patent No.: US 10,785,907 B2
(45) Date of Patent: Sep. 29, 2020

(54) CONTROLLING ROBOTIC LAWNMOWERS BASED ON FLUCTUATING WEATHER CONDITIONS

(71) Applicant: iRobot Corporation, Bedford, MA (US)

(72) Inventors: Brian Doughty, Framingham, MA (US); Andrew Beaulieu, Somerville, MA (US); Brian Yamauchi, Cambridge, MA (US); Alec Likhite, Arlington, MA (US); Erik Steltz, Melrose, MA (US)

(73) Assignee: iRobot Corporation, Bedford, MA (US)

( * ) Notice: Subject to any disclaimer, the term of this patent is extended or adjusted under 35 U.S.C. 154(b) by 194 days.

(21) Appl. No.: 16/037,090

(22) Filed: Jul. 17, 2018

(65) Prior Publication Data

US 2018/0332765 A1   Nov. 22, 2018

Related U.S. Application Data

(62) Division of application No. 14/808,613, filed on Jul. 24, 2015, now Pat. No. 10,034,421.

(51) Int. Cl.
*A01D 34/00* (2006.01)
*A01G 25/09* (2006.01)

(52) U.S. Cl.
CPC ........... *A01D 34/008* (2013.01); *A01G 25/09* (2013.01); *G05D 2201/0208* (2013.01); *Y10S 901/01* (2013.01)

(58) Field of Classification Search
CPC ............... A01D 34/008; A01D 34/006; G05D 2201/0208
See application file for complete search history.

(56) References Cited

U.S. PATENT DOCUMENTS 3,385,041 A   5/1968   Douglas
3,924,389 A   12/1975  Kita
(Continued)

FOREIGN PATENT DOCUMENTS

DE   19932552   2/2000
EP   0792726    9/1997
(Continued)

OTHER PUBLICATIONS

Supplementary European Search Report 16812659.7, dated Mar. 25, 2019, 4 pages.
(Continued)

*Primary Examiner* — Alicia Torres
(74) *Attorney, Agent, or Firm* — Fish & Richardson P.C.

(57) ABSTRACT

A method of mowing with an autonomous robot lawnmower includes traversing a mowable area with the autonomous robot lawnmower carrying a cutter and a vegetation characteristic sensor. The vegetation characteristic sensor is configured to generate sensor data in response to detecting a vegetation characteristic of the mowable area. The vegetation characteristic is selected from the group consisting of a moisture content, a grass height, and a color. The method includes storing position-referenced data representing the vegetation characteristic detected across the mowable area. The position-referenced data is based at least in part on the sensor data and position data. The method includes sending data to a remote device to cause the remote device to display a map including information based on the position-referenced data.

22 Claims, 11 Drawing Sheets

(56) References Cited

U.S. PATENT DOCUMENTS

| | | |
|---|---|---|
| 3,946,543 A | 3/1976 | Templeton |
| 4,133,404 A | 1/1979 | Griffin |
| 4,163,977 A | 8/1979 | Polstorff |
| 4,328,545 A | 5/1982 | Halsall et al. |
| 4,545,453 A | 10/1985 | Yoshimura et al. |
| 4,674,048 A | 6/1987 | Okumura |
| 4,700,301 A | 10/1987 | Dyke |
| 4,700,427 A | 10/1987 | Knepper |
| 4,767,237 A | 8/1988 | Cosman et al. |
| 4,777,416 A | 10/1988 | George, II et al. |
| 4,811,228 A | 3/1989 | Hyyppa |
| 4,887,415 A | 12/1989 | Martin |
| 4,909,024 A | 3/1990 | Jones et al. |
| 4,912,643 A | 3/1990 | Beirne |
| 4,918,441 A | 4/1990 | Bohman |
| 4,919,224 A | 4/1990 | Shyu et al. |
| 4,962,453 A | 10/1990 | Pong et al. |
| 5,002,145 A | 3/1991 | Waqkaumi et al. |
| 5,017,415 A | 5/1991 | Cosman et al. |
| 5,086,535 A | 2/1992 | Grossmeyer et al. |
| 5,163,273 A | 11/1992 | Wojtkowski et al. |
| 5,164,579 A | 11/1992 | Pryor et al. |
| 5,165,064 A | 11/1992 | Mattaboni |
| 5,204,814 A | 4/1993 | Noonan et al. |
| 5,208,521 A | 5/1993 | Aoyama |
| 5,293,955 A | 3/1994 | Lee |
| 5,321,614 A | 6/1994 | Ashworth |
| 5,369,347 A | 11/1994 | Yoo |
| 5,410,479 A | 4/1995 | Coker |
| 5,444,965 A | 8/1995 | Colens |
| 5,446,356 A | 8/1995 | Kim |
| 5,467,273 A | 11/1995 | Faibish et al. |
| 5,528,888 A | 6/1996 | Miyamoto et al. |
| 5,534,762 A | 7/1996 | Kim |
| 5,537,017 A | 7/1996 | Feiten et al. |
| 5,568,589 A | 10/1996 | Hwang |
| 5,621,291 A | 4/1997 | Lee |
| 5,622,236 A | 4/1997 | Azumi et al. |
| 5,652,489 A | 7/1997 | Kawakami |
| 5,682,313 A | 10/1997 | Edlund et al. |
| 5,682,839 A | 11/1997 | Grimsley et al. |
| 5,786,602 A | 7/1998 | Pryor et al. |
| 5,787,545 A | 8/1998 | Colens |
| 5,812,267 A | 9/1998 | Everett, Jr. et al. |
| 5,819,008 A | 10/1998 | Asama et al. |
| 5,825,981 A | 10/1998 | Matsuda |
| 5,916,111 A | 6/1999 | Colens |
| 5,942,869 A | 8/1999 | Katou et al. |
| 5,959,423 A | 9/1999 | Nakanishi et al. |
| 5,974,348 A | 10/1999 | Rocks |
| 6,009,358 A | 12/1999 | Angott et al. |
| 6,049,745 A | 4/2000 | Douglas et al. |
| 6,073,427 A | 6/2000 | Nichols |
| 6,076,025 A | 6/2000 | Ueno et al. |
| 6,076,227 A | 6/2000 | Schalig et al. |
| 6,112,143 A | 8/2000 | Allen et al. |
| 6,124,694 A | 9/2000 | Bancroft et al. |
| 6,133,730 A | 10/2000 | Winn |
| 6,166,706 A | 12/2000 | Gallagher et al. |
| 6,240,342 B1 | 5/2001 | Fiegert et al. |
| 6,255,793 B1 | 7/2001 | Peless et al. |
| 6,285,930 B1 | 9/2001 | Dickson et al. |
| 6,300,737 B1 | 10/2001 | Begvall et al. |
| D451,931 S | 12/2001 | Abramson et al. |
| 6,385,515 B1 | 5/2002 | Dickson et al. |
| 6,408,226 B1 | 6/2002 | Byrne et al. |
| 6,417,641 B2 | 7/2002 | Peless et al. |
| 6,442,476 B1 | 8/2002 | Poropat |
| 6,443,509 B1 | 9/2002 | Levin et al. |
| 6,463,368 B1 | 10/2002 | Feiten et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,532,404 B2 | 3/2003 | Colens |
| 6,535,793 B2 | 3/2003 | Allard |
| 6,574,536 B1 | 6/2003 | Kawagoe et al. |
| 6,580,246 B2 | 6/2003 | Jacobs |
| 6,580,978 B1 | 6/2003 | McTamaney |
| 6,584,376 B1 | 6/2003 | Kommer |
| 6,594,844 B2 | 7/2003 | Jones |
| 6,605,156 B1 | 8/2003 | Clark et al. |
| 6,611,120 B1 | 8/2003 | Song et al. |
| 6,611,738 B2 | 8/2003 | Raffner |
| 6,615,108 B1 | 9/2003 | Peless et al. |
| 6,661,239 B1 | 12/2003 | Ozik |
| 6,671,592 B1 | 12/2003 | Bisset et al. |
| 6,690,134 B1 | 2/2004 | Jones et al. |
| 6,781,338 B2 | 8/2004 | Jones et al. |
| 6,809,490 B2 | 10/2004 | Jones et al. |
| 6,845,297 B2 | 1/2005 | Allard |
| 6,850,024 B2 | 2/2005 | Peless et al. |
| 6,870,792 B2 | 3/2005 | Chiappetta |
| 6,883,201 B2 | 4/2005 | Jones et al. |
| 6,885,912 B2 | 4/2005 | Peless et al. |
| D510,066 S | 9/2005 | Hickey et al. |
| 6,940,291 B1 | 9/2005 | Ozik |
| 6,956,348 B2 | 10/2005 | Landry et al. |
| 6,984,952 B2 | 1/2006 | Peless et al. |
| 7,024,278 B2 | 4/2006 | Chiapetta et al. |
| 7,069,124 B1 | 6/2006 | Whittaker et al. |
| 7,085,624 B2 | 8/2006 | Aldred et al. |
| 7,142,693 B2 | 11/2006 | Zhang et al. |
| 7,155,309 B2 | 12/2006 | Peless et al. |
| 7,203,576 B1 | 4/2007 | Wilson et al. |
| 7,349,759 B2 | 3/2008 | Peless et al. |
| 7,525,287 B2 | 4/2009 | Miyashita et al. |
| 7,677,344 B2 | 3/2010 | Medina et al. |
| 7,729,801 B2 | 6/2010 | Abramson |
| 8,069,639 B2 | 12/2011 | Fancher, III |
| 8,136,333 B1 | 3/2012 | Levin et al. |
| 8,295,979 B2 | 10/2012 | Thacher et al. |
| 8,306,659 B2 | 11/2012 | Abramson et al. |
| 8,322,072 B2 | 12/2012 | Anderson |
| 8,413,616 B2 | 4/2013 | Bergquist |
| 8,482,736 B2 | 7/2013 | Franzen et al. |
| 8,532,822 B2 | 9/2013 | Abramson et al. |
| 8,634,960 B2 | 1/2014 | Sandin et al. |
| 8,635,841 B2 | 1/2014 | Fiser et al. |
| 8,781,627 B2 | 7/2014 | Sandin et al. |
| 8,868,237 B2 | 10/2014 | Sandin et al. |
| 8,954,193 B2 | 2/2015 | Sandin et al. |
| 8,958,939 B2 | 2/2015 | Einecke et al. |
| 8,996,171 B2 | 3/2015 | Anderson et al. |
| 9,043,129 B2 | 5/2015 | Bonefas et al. |
| 9,043,952 B2 | 6/2015 | Sandin et al. |
| 9,043,953 B2 | 6/2015 | Sandin et al. |
| 10,034,421 B2 | 7/2018 | Doughty et al. |
| 2001/0047231 A1 | 11/2001 | Peless et al. |
| 2002/0016649 A1 | 2/2002 | Jones |
| 2002/0049517 A1 | 4/2002 | Ruffner |
| 2002/0140393 A1 | 10/2002 | Peless et al. |
| 2002/0156556 A1 | 10/2002 | Ruffner |
| 2002/0173877 A1 | 11/2002 | Zweig |
| 2003/0023356 A1 | 1/2003 | Keable |
| 2003/0060928 A1 | 3/2003 | Abramson et al. |
| 2003/0120389 A1 | 6/2003 | Abramson et al. |
| 2003/0182914 A1 | 10/2003 | Shibata et al. |
| 2003/0208304 A1 | 11/2003 | Peless et al. |
| 2003/0216834 A1 | 11/2003 | Allard |
| 2003/0234325 A1 | 12/2003 | Marino et al. |
| 2004/0020000 A1 | 2/2004 | Jones |
| 2004/0076324 A1 | 4/2004 | Burl et al. |
| 2004/0088079 A1 | 5/2004 | Lavarec et al. |
| 2004/0111184 A1 | 6/2004 | Chiappetta et al. |
| 2004/0111196 A1 | 6/2004 | Dean |
| 2004/0187457 A1 | 9/2004 | Colens |
| 2005/0007057 A1 | 1/2005 | Peless et al. |
| 2005/0108999 A1 | 5/2005 | Bucher |
| 2007/0142964 A1 | 6/2007 | Abramson |
| 2007/0150109 A1 | 6/2007 | Peless et al. |
| 2008/0039974 A1 | 2/2008 | Sandin et al. |
| 2008/0097645 A1 | 4/2008 | Abramson et al. |
| 2008/0161968 A1 | 7/2008 | Adegbile |
| 2008/0167753 A1 | 7/2008 | Peless et al. |

(56) References Cited

U.S. PATENT DOCUMENTS

| | | |
|---|---|---|
| 2008/0183349 A1 | 7/2008 | Abramson et al. |
| 2009/0254218 A1 | 10/2009 | Sandin et al. |
| 2010/0059000 A1 | 3/2010 | Bergquist |
| 2010/0102525 A1 | 4/2010 | Fancher |
| 2011/0130875 A1 | 6/2011 | Abramson |
| 2011/0166715 A1 | 7/2011 | Hoffman |
| 2011/0234153 A1 | 9/2011 | Abramson |
| 2012/0041594 A1 | 2/2012 | Abramson et al. |
| 2012/0158915 A1* | 6/2012 | Ham .................. A47L 9/2868 709/219 |
| 2012/0226381 A1 | 9/2012 | Abramson et al. |
| 2012/0265391 A1* | 10/2012 | Letsky ............. A01D 34/008 701/25 |
| 2012/0290165 A1 | 11/2012 | Ouyang |
| 2013/0006419 A1 | 1/2013 | Bergstrom et al. |
| 2013/0030609 A1 | 1/2013 | Jagenstedt |
| 2013/0047565 A1 | 2/2013 | Shida |
| 2013/0066484 A1 | 3/2013 | Markusson et al. |
| 2013/0076304 A1 | 3/2013 | Andersson et al. |
| 2013/0110322 A1 | 5/2013 | Jagenstedt et al. |
| 2013/0152538 A1 | 6/2013 | Fiser et al. |
| 2013/0184924 A1 | 7/2013 | Jagenstedt et al. |
| 2013/0212994 A1 | 8/2013 | Hwang et al. |
| 2013/0249179 A1 | 9/2013 | Burns |
| 2013/0274920 A1 | 10/2013 | Abramson et al. |
| 2014/0102061 A1 | 4/2014 | Sandin et al. |
| 2014/0102062 A1 | 4/2014 | Sandin et al. |
| 2014/0117892 A1 | 5/2014 | Coates |
| 2015/0006015 A1 | 1/2015 | Sandin et al. |
| 2015/0163993 A1 | 6/2015 | Pettersson |
| 2018/0038993 A1* | 2/2018 | Jagenstedt ............. G01W 1/02 |

FOREIGN PATENT DOCUMENTS

| | | |
|---|---|---|
| EP | 0774702 | 10/2001 |
| EP | 1331537 | 7/2003 |
| EP | 1704766 | 9/2006 |
| EP | 2946650 | 11/2015 |
| FR | 2828589 | 2/2003 |
| GB | 2142447 | 1/1985 |
| GB | 2283838 | 5/1995 |
| GB | 2382157 | 5/2003 |
| JP | 26312 | 1/1990 |
| JP | 4320612 | 11/1992 |
| JP | 3356170 | 10/2002 |
| JP | 3375843 | 11/2002 |
| WO | 1999059042 | 11/1999 |
| WO | 2002062194 | 8/2002 |
| WO | 2003026474 | 4/2003 |
| WO | 2003065140 | 8/2003 |
| WO | 2004058028 | 1/2004 |
| WO | WO 2013/096493 | 6/2013 |
| WO | WO 2015/007740 | 1/2015 |
| WO | WO 2015/022672 | 2/2015 |

OTHER PUBLICATIONS

"2015 LawnBott Robotic Lawn Mower Specifications," Lawnbotts.com, 2015, 3 pages.

"Lawn Mower Robot, Installation Course V. 2010," Lawnbotts.com, Jan. 2010, 25 pages.

"LawnBott LB200EL User Manual," Lawnbotts.com, Dec. 2013, 40 pages.

"LawnBott LB300EL User Manual," Lawnbotts.com, Dec. 2013, 40 pages.

"LawnBott LB3210, LB2110 User Manual," Lawnbotts.com, Jul. 2009, 56 pages.

"LB3500 Installation Course," Lawnbotts.com. 2015, 11 pages.

Flymo, "Robotic Lawnmower 1200 R," Installation Manual, 2012, 70 pages.

Friendly Robotics, "Robotic Mower," Robomow, Operating Manual, 2014, 50 pages.

Gat, "Robust Low-Computation Sensor-driven Control for Task-Directed Navigation," Proc of IEEE International Conference on Robotics and Automation, Sacramento, CA, Apr. 1991, pp. 2484-2489.

Hicks and Hall, "A Survey of Robot Lawn Mowers", http://www.robotics.uc.edu/papers/paper2000/lawnmower.pdf, 2000, 8 pages.

International Preliminary Report on Patentability in International Patent Application No. PCT/US2016/043532, dated Jan. 30, 2018, 10 pages.

Matthies et al., "Detecting Water Hazards for Autonomous Off-Road Navigation," Proceedings of SPIE Conference 5083. Unmanned Ground Vehicle Technology V, Orlando, FL, Apr. 2003, pp. 231-242.

Morland,"Autonomous Lawnmower Control," Downloaded from the internet at: http://cns.bu.edu/~cjmorlan/robotics/lawnmower/report.pdf, Jul. 2002, 10 pages.

Probotics, "BigMow," Probotics.com, 2004, 3 pages.

Probotics, "BigMow," User Manual, Probotics.com, 2004, 28 pages.

Probotics, "How the Robomower Works," Probotics.com, 2004, 3 pages.

Thrun, "Learning Occupancy Grid Maps With Forward Sensor Models," Autonomous Robots 15, Sep. 1, 2003, 28 pages.

Wigley, "The Electric Lawn", in The American Lawn, Princeton Architectural Press New York with Canadian Centre for Architecture Montreal, 1999, pp. 155-195.

Worx, "Landroid, Unmanned Mowing Vehicle," User Manual, 2015, 52 pages.

International Search Report and Written Opinion in International Application No. PCT/US2016/043532, dated Oct. 5, 2016, 11 pages.

\* cited by examiner

CONTROLLING ROBOTIC LAWNMOWERS BASED ON FLUCTUATING WEATHER CONDITIONS

CROSS-REFERENCE TO RELATED APPLICATIONS

This application is a divisional of and claims priority to U.S. application Ser. No. 14/808,613, filed on Jul. 24, 2015, the entire contents of which are hereby incorporated by reference.

TECHNICAL FIELD

This disclosure relates to controlling robotic lawnmowers.

BACKGROUND

Robotic lawnmowers can perform mowing operations in which the robotic lawnmowers autonomously navigate about mowable areas to mow vegetation within the mowable areas. Users can manually activate and deactivate the robotic lawnmowers to selectively cause the robotic lawnmowers to perform the mowing operations when desired, or they can be preprogrammed to mow on a particular schedule.

SUMMARY

In some examples, a method of mowing with an autonomous robot lawnmower includes traversing a mowable area with the autonomous robot lawnmower carrying a cutter and a vegetation characteristic sensor. The vegetation characteristic sensor is configured to generate sensor data in response to detecting a vegetation characteristic of the mowable area. The vegetation characteristic is selected from the group consisting of a moisture content, a grass height, and a color. The method includes storing position-referenced data representing the vegetation characteristic detected across the mowable area. The position-referenced data is based at least in part on the sensor data and position data. The method includes sending data to a remote device to cause the remote device to display a map including information based on the position-referenced data.

In some examples, the vegetation characteristic can include the color. The map can include a representation of the mowable area color-coded based on the color of the vegetation. The method can include sending data to the remote device to cause the remote device to display a recommendation based on the color of the vegetation. The recommendation can be selected from the group consisting of a recommendation to water one or more portions of the mowable area and a recommendation to modify the mowing frequency.

In some examples, the vegetation characteristic can include the grass height, the map can include a representation of the mowable area color-coded based on the grass height of the vegetation, and the method can include sending data to the remote device to cause the remote device to display a recommendation based on the grass height of the vegetation. The recommendation can be selected from the group consisting of a recommendation to water one or more portions of the mowable area and a recommendation to modify the mowing frequency.

In some examples, the vegetation characteristic can include the moisture content, the map can include a representation of the mowable area color-coded based on the moisture content, and the method further can include sending data to the remote device to cause the remote device to display a recommendation based on the moisture content of the vegetation. The recommendation can be a recommendation to water one or more portions of the mowable area. The recommendation can be a recommendation to modify the mowing frequency.

In some examples, the method can include controlling the robot to mow the area based on the position-referenced data. The method can include generating an adjusted mowing schedule based on the position-referenced data representing the vegetation characteristic and a current mowing schedule. The method can include sending data to a remote device to cause the remote device to display the adjusted mowing schedule. The method can include receiving from the remote device a confirmation of the adjusted mowing schedule.

In some examples, the method can include, while controlling the robot to mow the mowable area, sensing an obstacle encountered by the robot and storing position-referenced data related to the sensed obstacle. The method can include comparing the stored position-referenced data related to the sensed obstacle with previously stored position-referenced data and communicating an alert in response to a difference between the stored position-referenced data related to the sensed obstacle and the previously stored position-referenced data.

In some examples, traversing the mowable area can be performed on one date, and controlling the robot to mow the mowable area based on the position-referenced data can be performed on another date.

In some examples, the method can include calculating a grass health score for the mowable area based on the position-referenced data and sending data to the remote device to cause the remote device to display the grass health score.

In some examples, the method can include receiving grass health scores for other mowable areas, comparing the other grass health scores to the grass health score, and communicating the comparison between the calculated grass health score for the mowable area and the other grass health scores for other mowable areas.

In some examples, calculating the grass health score can include comparing the position-referenced data representing the vegetation characteristic to baseline data representing vegetation characteristics.

In some examples, the vegetation characteristic sensor can include a sensor to monitor power expended to drive a cutter of the robot.

In some examples, an autonomous mowing robot includes a chassis suspending a grass cutter, a wheeled drive system supporting the chassis and operable to navigate the robot across a mowable area, and a vegetation characteristic sensor configured to generate sensor data in response to detecting a vegetation characteristic of the mowable area. The vegetation characteristic is selected from the group consisting of color, grass height, and moisture content. The autonomous mowing robot includes an electronic memory configured to store position-referenced data representing the vegetation characteristic across the mowable area. The position-referenced data is based at least in part on the sensor data from the vegetation characteristic sensor and position data. The robot includes an electronic processor connected to the memory. The electronic process is configured to receive via a wireless receiver on the robot from a remote system information about a fluctuating weather condition related to a mowable area, adjust a mowing schedule based on information about the fluctuating weather condition, and control the autonomous mowing robot to mow the mowable area based on the mowing schedule.

In some examples, the electronic processor can be configured to control the wheeled drive system and the grass cutter based on the position-referenced data and send data to a remote device to cause the remote device to display a map including information based on the position-referenced data.

In some examples, the vegetation characteristic sensor can include at least one of an optical sensor configured to detect the color, a pressure sensor configured to detect the grass height, and a capacitance sensor configured to detect the moisture content.

In some examples, the vegetation characteristic sensor can include a sensor to monitor power expended to drive a cutter of the robot.

In some examples, a method of mowing with an autonomous robot lawnmower includes receiving via a wireless receiver on the robot from remote system information about a fluctuating weather condition related to a mowable area, adjusting a mowing schedule based on the information about the fluctuating weather condition, and controlling an autonomous mowing robot to mow the mowable area based on the mowing schedule.

In some examples, the fluctuating weather condition can include a weather forecast at the mowable area, and adjusting the mowing schedule comprises adjusting the mowing schedule based on an expected rainfall for the mowable area.

In some examples, the method can include determining a vegetation characteristic of the mowable area based on sensor data from a vegetation characteristic sensor on the robot configured to generate the sensor data in response to detecting the vegetation characteristic. The vegetation characteristic can be selected from the group consisting of a moisture content, a grass height, and a color. Adjusting the mowing schedule can include adjusting the mowing schedule based on the fluctuating weather condition and the determined vegetation characteristic.

In some examples, the method can include determining a level of power expended to drive a cutter of the robot. Adjusting the mowing schedule further can include adjusting the mowing schedule based on the fluctuating weather condition and the determined level of power expended to drive the cutter of the robot.

In some examples, the method can include, prior to adjusting the mowing schedule, forwarding information about the fluctuating weather condition to a remote device, and waiting for a prompt from the remote device before adjusting the mowing schedule.

Systems designed to implement these concepts can generate and provide information about conditions and characteristics of the mowable area to a user, enabling the user to make informed decisions about lawn care. The information can summarize data pertaining to the characteristics of the mowable area in a manner that allows the user to readily understand actual lawn health, for example, and prompt the user to take appropriate measures to improve health. Such a system can also be implemented in a manner that automatically adapts to fluctuating lawn conditions and weather patterns.

Any two or more of the features described in this specification, including in this summary section, can be combined to form implementations not specifically described herein.

The robotic lawnmowers, or operational aspects thereof, described herein can be implemented as/controlled by a computer program product that includes instructions that are stored on one or more non-transitory machine-readable storage media, and that are executable on one or more processing devices to control (e.g., to coordinate) the operations described herein. The robotic lawnmowers, or operational aspects thereof, described herein can be implemented as part of a system or method that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
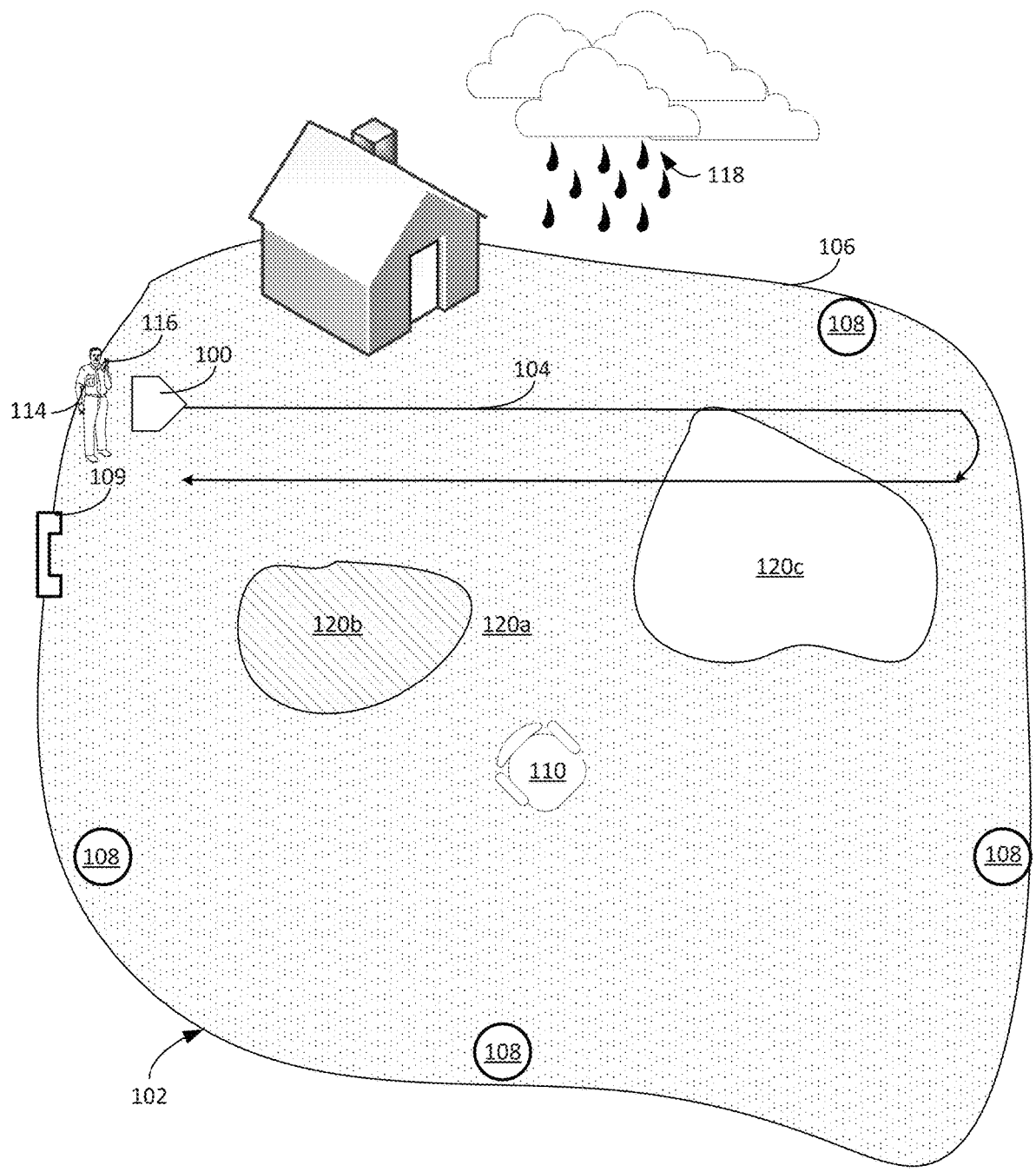
FIG. 1 illustrates a robotic lawnmower navigating about a mowable area.

Example methods and systems are described below that can advantageously promote grass health while performing a useful area coverage function such as mowing. These examples determine vegetation characteristics and fluctuating conditions of mowable areas (e.g., lawns), inform users of those characteristics and conditions, and control operations of autonomous robotic lawnmowers across the mowable areas based on those characteristics and conditions. In some examples, as a robotic lawnmower traverses a mowable area, the lawnmower detects a vegetation characteristic using a vegetation characteristic sensor disposed on the robotic lawnmower. The vegetation characteristic sensor detects characteristics of vegetation (e.g., grass) underlying the robotic lawnmower, such as grass height, color, or moisture content. The vegetation characteristic sensor is a sensor responsive to one or more of these vegetation characteristics, such as a pressure sensor, a force/torque transducer, an optical sensor, a color sensor, or a capacitance sensor. The sensor generates data based on the detection of one or more vegetation characteristics, which an electronic processor of the lawnmower receives and uses to perform various operations to promote grass health, as described below.

In addition to detecting vegetation characteristics about the robotic lawnmower, in some implementations, the robotic lawnmower receives information from a remote system about historic, current and anticipated weather conditions at the mowable area. The remote system is a server that updates and stores information about the fluctuating weather condition and also wirelessly transmits the information to the robotic lawnmower. The remote system communicates with the robotic lawnmower, for example, using wireless signals, such as WiFi®, Bluetooth®, and other appropriate wireless protocols.

Based on the vegetation characteristics and the fluctuating weather conditions, the system controls operations of the robotic lawnmower. The robotic lawnmower also estimates its location within the mowable area as it travels across the mowable area. Based on that estimated location and on the detected vegetation characteristics, the robotic lawnmower generates position-referenced data that considers the vegetation characteristics at locations across the mowable area. In some examples, using position-referenced data, the robotic lawnmower controls its movement about the mowable area. Using the position-referenced data, if the electronic processor determines the mowable area may benefit from a change in mowing operations, the electronic processor provides a recommendation that the robotic lawnmower should not mow a particular portion of the mowable area due to poor grass health in that portion. The recommendations provided by the electronic processor can improve grass health and aesthetic. In some examples, the robotic lawnmower additionally determines from the position-referenced data the presence of obstacles that should be removed from the mowable area so that the robotic lawnmower mows the grass beneath those obstacles.

In response to a recommendation from the system, the mowing schedule can be adjusted. In some cases, the robotic lawnmower automatically adjusts its mowing schedule in response to the recommendation. Alternatively or additionally, a user of the robotic lawnmower adjusts the mowing schedule of the robotic lawnmower in response to a communication from the system informing the user of the recommendation. Such a recommendation is based on information about, for example, a recent increase in precipitation that results in a faster rate of grass growth and require a higher frequency of mowing, or a prediction of future precipitation during which the robotic lawnmower may damage the vegetation or soil if the robotic lawnmower performs a mowing operation.

A user responds to recommendations and alerts that indicate ways for the user to provide lawn care that promotes health and aesthetic of vegetation in the mowable area. The user controls the robotic lawnmower and monitors operations of the robotic lawnmower by, for example, directly interacting with a user interface of the robotic lawnmower or using a remote device (e.g., a mobile device, cell phone, smart phone, smart watch or computer) in wireless communication (e.g., WiFi® communication) with the robotic lawnmower. In some examples, the lawnmower transmits data that causes the remote device to display a map that visualizes the position-referenced data generated by the robotic lawnmower during its travel across the mowable area. The map provides a visual representation of the vegetation characteristics to the user. The remote device also receives recommendations determined based on the vegetation characteristics and the fluctuating weather conditions. In some examples, the remote device displays a recommendation proposing to adjust the mowing schedule based on predicted precipitation. To allow the adjustment to occur, the user confirms adjusting the mowing schedule using the remote device, thus allowing the user to remotely control scheduled operations of the robotic lawnmower. In some cases, the recommendations indicate to the user that portions of the mowable area require attention. For example, if portions of the mowable area has lower moisture content than other portions, the remote device indicates to the user such a difference in moisture content. The remote device notifies the user that these portions require additional lawn care such as water or fertilizer.

In some cases, a grass health score of the mowable area is determined based on the vegetation characteristics, and transmitted to the remote device to provide the user with a simple overall indication of the health of the mowable area. The grass health score is computed based on one or more different vegetation characteristics (e.g., grass height, moisture content, and/or color). While described as a grass health score, in some examples, the score further indicates an aesthetic appeal of the mowable area. To provide a comparison of the user's performance relative to other users of robotic lawnmowers described herein, the grass health score is compared to other grass health scores determined by other mowing systems operating in other mowable areas. The comparison gives the user a sense of the relative health of the user's lawn in comparison with those of other users.

FIG. 1 depicts an example of an autonomous robot mowing system. An autonomous robotic lawnmower 100 of the mowing system traverses a mowable area 102. The mowable area 102 includes vegetation, such as grass, that the robotic lawnmower 100 mows as it follows a path 104 through the mowable area 102. The mowable area 102 is defined by a boundary 106 (e.g., a fence, property line, etc.).

The robotic lawnmower 100 establishes and follows path 104 while localizing using beacons 108 located throughout or near the mowable area 102. The robotic lawnmower 100 localizes using the beacons 108 such that the robotic lawnmower 100 determines its position within the mowable area 102 during its operations. The beacons 108 emit wideband or ultra-wideband frequencies with which the robotic lawnmower 100 estimates its position within the mowable area 102 while the robotic lawnmower 100 moves about the mowable area 102. Wideband signals are radiofrequency signals having a frequency between 5925 and 7250 MHz Hertz, and ultra-wideband signals are radiofrequency signals having a frequency greater than 500 MHz, for example, between 3.1 GHz and 10.6 GHz.

Following a mowing operation, the robotic lawnmower 100 returns to a docking station 109, where it recharges its power source and awaits further instructions. In some examples, the docking station 109 also serves as a beacon used by the robotic lawnmower 100 to localize its location within the mowable area 102. Movable fixtures, such as a lawn chair 110, are located within the mowable area 102.

A remote device 116 allows a user 114 to control and monitor the robotic lawnmower 100. In some examples, the user directly interacts with a user interface of the robotic lawnmower 100 to control and monitor the robotic lawnmower 100.

In some examples, weather conditions at the mowable area 102 fluctuate. In the example shown in FIG. 1, the mowable area 102 is not receiving rain at the present but likely will receive incoming rain 118 in the future. A schedule of the mowing operations of the robotic lawnmower 100 is modified based on information indicating the fluctuating weather conditions that includes the incoming rain 118. The schedule is modified, for example, to improve grass health of the mowable area 102.

Vegetation characteristics vary throughout the mowable area 102. The vegetation characteristics are, for example, grass height, color, moisture content, or other characteristics that are indicators for health of the vegetation throughout the mowable area 102. Generally, the user 114 seeks to improve the vegetation characteristics of the mowable area 102 to improve the overall health of vegetation (e.g., grass) in the mowable area 102.

As depicted schematically in FIG. 1, the mowable area 102 includes portions 120a, 120b, 120c, each having a different level of a vegetation characteristic. The separation of the mowable area 102 into the portions 120a, 120b, 120c having varying vegetation characteristics is made readily visible to the user 114, for example, on a map representing the mowable area 102. The remote device 116 or the user interface of the robotic lawnmower 100 displays the map to enable the user 114 to view the map. The map provides the user 114 with a sense of the condition of vegetation throughout the mowable area 102. The vegetation characteristic is shown as three separate discrete levels (e.g., as would be visible on a user interface of the remote device 116, as described below), though measurements of vegetation characteristics, in some cases, are situated along a continuous range (e.g., grass height in centimeters, color ranging from brown to green, or amount of moisture). In some implementations, fewer or more levels than the three described are generated.

The portion 120a has a level of vegetation characteristics that is generally desirable. The portion 120a is, for example, healthy, aesthetically pleasing, or have other desirable characteristics. The portion 120a of the mowable area 102 has vegetation characteristics that are within a healthy range for baseline values of vegetation characteristics for healthy vegetation. The portion 120b has a level of the vegetation characteristics that is generally less desirable for the user 114 but does not require immediate attention from the user 114 to correct for the less-than-desirable characteristics. In contrast, portion 120c has a level of vegetation characteristics sufficiently outside of the range of baseline values of vegetation characteristics for healthy vegetation. In the portion 120c, further degradation of the vegetation characteristics may result in irreparable damage to the vegetation should attention or correction be delayed. Based on these variations in vegetation characteristic, the robotic lawnmower 100 proposes recommendation that can improve health of the vegetation, particularly in those portions with less desirable vegetation characteristics. In some cases, the robotic lawnmower 100 automatically executes these recommendations, which cause modifications in, for example, mowing operations and mowing schedules associated with the robotic lawnmower 100.

Figure 2:
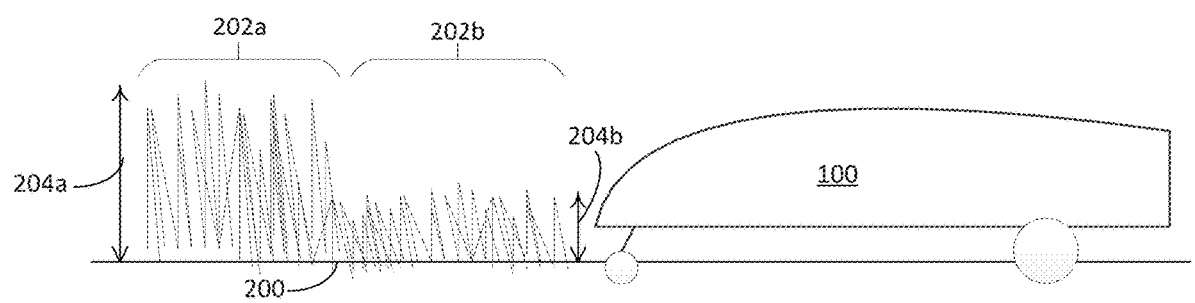
FIG. 2 is a side view of a robotic lawnmower traversing a mowable area containing grass of different length.

In some examples, the vegetation characteristic is grass height. As shown in FIG. 2, vegetation 200 on the mowable area 102 includes portions 202a, 202b each having different average vegetation heights 204a, 204b. The average height 204a is greater than the average height 204b. The robotic lawnmower 100 detects the average height 204a, 204b using sensors and proposes recommendations for modifying mowing operations based on the average height 204a, 204b. These recommendations, for example, include suggestions for modifications that can prevent vegetation in the mowable area 102 from acquiring diseases, thus improving overall grass health in the mowable area 102.

Figure 3:
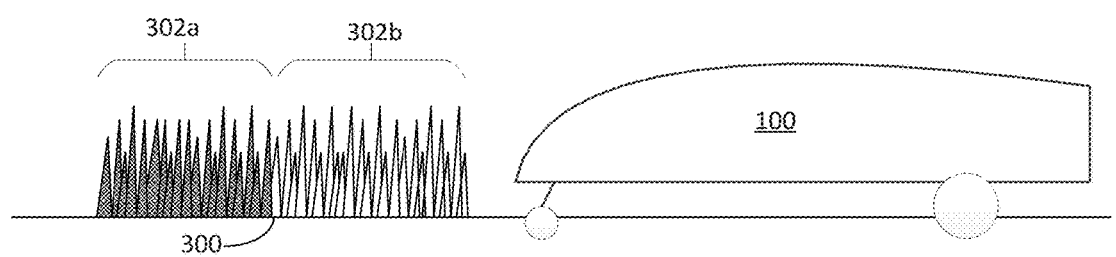
FIG. 3 is another side view of a robotic lawnmower traversing grass of different color or otherwise differing in a sensible characteristic.

In some examples, sensed vegetation characteristics include moisture content or color. As shown in FIG. 3, vegetation 300 on the mowable area 102 includes portions 302a, 302b with different colors or moisture content of the vegetation 200. In this example, the color of vegetation in portion 302a is brown, and the color of vegetation in portion 302b is green, though other examples may include other variations in color. The vegetation 300 in portion 302a has a moisture content below the moisture content of vegetation in portion 302b. The robotic lawnmower 100 detects the colors of the vegetation using sensors and proposes recommendations for modifying mowing operations based on the detected colors. These recommendations include suggestions for lawn care, such as adding water or fertilizer, that can restore the color to colors that are typical of healthy vegetation (e.g., green).

Figure 4:
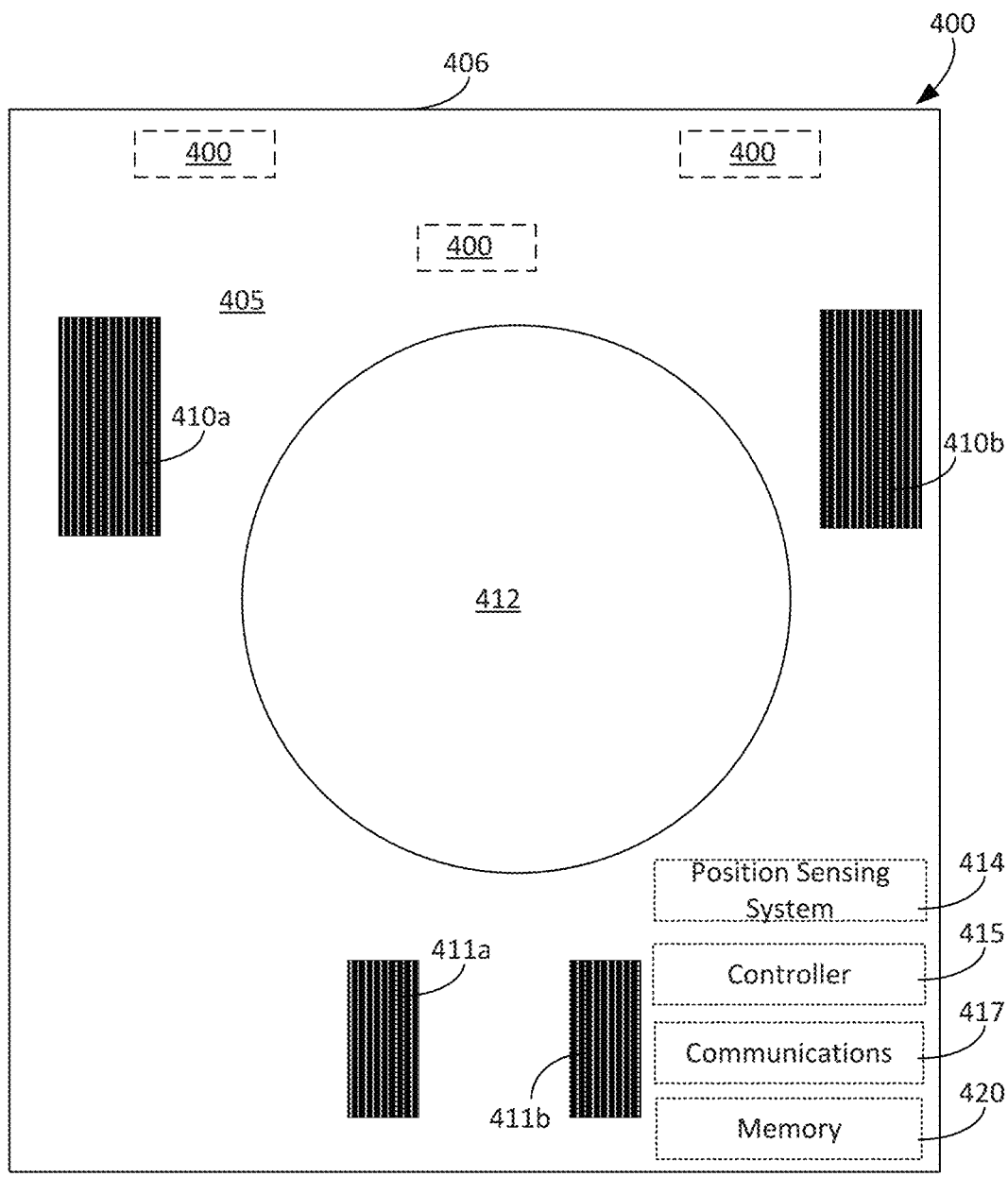
FIG. 4 is a schematic, bottom view of a robotic lawnmower.

To detect average height or color or moisture content of the vegetation as the robotic lawnmower mows or otherwise travels across the area, the robotic lawnmower includes appropriate sensors. As shown in FIG. 4, robotic lawnmower 100 includes vegetation characteristic sensors 400 along a bottom surface 405 or along a forward edge of the robotic lawnmower. The vegetation characteristic sensors 400 generate sensor data in response to detecting vegetation characteristics of the mowable area 102 underlying the robotic lawnmower 100 as the robotic lawnmower 100 traverses the mowable area 102.

The robotic lawnmower 100 also includes a chassis 406 that houses, among other components, vegetation characteristic sensors 400. Drive wheels 410a, 410b and one or more motors driving the drive wheels 410a, 410b form a wheeled drive system to navigate the robotic lawnmower 100 across the mowable area 102. The drive wheels 410a, 410b and caster wheels 411a, 411b, all extending from the bottom surface 405 of the robotic lawnmower 100, cooperate to support the chassis 406 of the robotic lawnmower 100 above the mowable area 102. As the robotic lawnmower 100 moves across the mowable area 102, to mow vegetation below the lawnmower, the robotic lawnmower 100 activates a grass cutter 412 on the bottom surface 405. The grass cutter 412 includes, for example, blades that the robotic lawnmower 100 reciprocates to cut vegetation on the mowable area 102.

A position sensing system 414 carried on the robotic lawnmower 100 estimates a position of the robotic lawnmower 100 as it moves within the mowable area 102. In some cases, the position sensing system 414 includes a global position system (GPS) sensor that determines a geographical position of the robotic lawnmower 100. The position sensing system 414 alternatively or additionally includes sensors that allows the robotic lawnmower 100 to perform dead reckoning to estimate its position within the mowable area. To perform dead reckoning, the position sensing system 414 includes an optical mouse sensor, encoders operable with the wheeled drive system, and other appropriate sensors that generate signals from which the robotic lawnmower 100 estimate its position within the mowable area 102. To communicate with the beacons 108, the position sensing system 414 also includes a wideband or ultra-wideband transceiver that receives signals emitted by the beacons 108. Using those signals, the robotic lawnmower 100 localizes its position within the mowable area 102.

To detect grass height of vegetation, the vegetation characteristic sensors 400 includes a pressure sensor that responds to contact with vegetation (e.g., the vegetation 200, 300) of the mowable area 102. The contact generates a pressure on the pressure sensor that causes the pressure sensor to generate sensor data indicative of a grass height. Such a pressure sensor is preferably positioned at or near a forward edge of the chassis to be responsive to vegetation prior to cutting. The pressure sensor is mounted on a forward side of the robot, for example.

To detect color of vegetation, the vegetation characteristic sensors 400 includes an optical sensor that detects color of the mowable area 102. The optical sensor emits radiation toward vegetation on the mowable area 102 and detects reflections of the radiation. In response to detecting the reflections, the optical sensor generates sensor data indicative of color of vegetation near or beneath the chassis. To detect vegetation color, the optical sensor is responsive to hues typical of vegetation (e.g., grass), such as yellow, green, and brown hues.

To detect moisture content of vegetation, the vegetation characteristic sensors 400 includes a capacitance sensor responsive to moisture content of vegetation engaged by the sensor. Moisture in the vegetation can increase conductivity of the vegetation, and the capacitance sensor thus estimates moisture by measuring capacitance. In response to greater amounts of moisture contained in the vegetation of mowable area 102, the capacitance sensor detects a decrease in capacitance. In some implementations, the vegetation characteristic sensors 400 measures other electrical characteristics, such as resistivity, that indicate the moisture content of the vegetation.

Alternatively or additionally, the vegetation characteristic sensors 400 include sensors that detect characteristics of the operations of the robotic lawnmower 100 that change as a function of vegetation characteristics. These sensors do not directly detect vegetation characteristics but rather sense operation characteristics of the robotic lawnmower. The vegetation characteristic sensors 400 include, for example, a power sensor that monitors power expended by the grass cutter 412, a power sensor that monitors power expended by the drive wheels 410a, 410b, or other sensor that measures a robotic lawnmower operation that varies with vegetation characteristics. The data generated by the power sensors are indicative of vegetation characteristics. In some examples, the grass cutter 412 expends greater amounts of power when cutting longer, denser or wetter vegetation. The drive wheels 410a, 410b also expend greater amounts of power due to higher grass heights.

The vegetation characteristic sensors 400 transmit sensor data to an electronic processor 415 housed in the chassis 406. The electronic processor 415, in addition to receiving data representing vegetation and robotic lawnmower characteristics, controls operations of the robotic lawnmower 100. The electronic processor 415 operates the drive wheels 410a, 410b by modulating a power delivered to each of the motors driving the drive wheels 410a, 410b. The electronic processor 415 adjusts the power to navigate the robotic lawnmower 100 across the mowable area 102.

The electronic processor 415 also operates the grass cutter 412 by modulating a power delivered to the grass cutter 412. In some examples, when the robotic lawnmower 100 is positioned on the mowable area 102, the electronic processor 415 adjusts the height of the grass cutter 412 to modulate the portion of the height of the underlying vegetation that the grass cutter 412 mows. The electronic processor 415 actuates motors coupled to the grass cutter 412 that increase or decrease the height of the grass cutter 412. In some cases, to reduce the risk of exposing vegetation to disease, the electronic processor 415 changes the height of the grass cutter 412 so that the grass cutter 412 removes no more than 33% of the height of the vegetation during any mowing operation.

A communications system 417 housed in the chassis 406 allows the electronic processor 415 to communicate with remote devices (e.g., a remote server, the remote device 116). The communications system 417 includes a wireless receiver, a wireless transmitter, and/or a wireless transceiver that wirelessly communicates with the remote devices using, for example, WiFi®, Bluetooth®, or other wireless communications protocols. The communications system 417 thus sends data to and receives data from the remote devices. After the electronic processor 415 receives the sensor data from the vegetation characteristic sensors 400 generated during operation of the robotic lawnmower 100, the electronic processor 415 then transmits electrical signals to the communications system 417, which in turn generates data to send to the remote devices. The communications system 417 also receives information and data transmitted from the remote devices and generates corresponding electrical signals to be processed by the electronic processor 415 to control operations of the robotic lawnmower 100.

The electronic processor 415 is operable with memory 420, which stores data and information received from the electronic processor 415 as well as predetermined data and information pertaining to the operations of the robotic lawnmower 100. The electronic processor 415 receives position data from the position sensing system 414 and store the position data. The electronic processor 415 also receives the sensor data from the vegetation characteristic sensors 400 and stores the sensor data. As stored in memory 420, the sensor data is referenced to corresponding position data collected by the position sensing system 414. Thus, the electronic processor 415 generates position-referenced data based on the sensor data and the position data and stores the position-referenced data in memory 420. The position-referenced data thus represents the vegetation characteristic detected across the mowable area 102 at various locations throughout the mowable area 102.

Memory 420 stores, for example, a mowing schedule associated with the mowing operations of the robotic lawnmower 100. The mowing schedule includes information indicative of when to perform mowing operations, such as start times at which the robotic lawnmower 100 begins mowing the mowable area 102. When the mowing schedule indicates to the robotic lawnmower 100 to begin a mowing operation, the electronic processor 415 controls the wheeled drive system (e.g., including the drive wheels 410a, 410b) and the grass cutter 412 to cause the robotic lawnmower 100 to mow the mowable area 102. As described herein, the electronic processor 415 is able to adjust the mowing schedule based on the position-referenced data.

Figure 5:
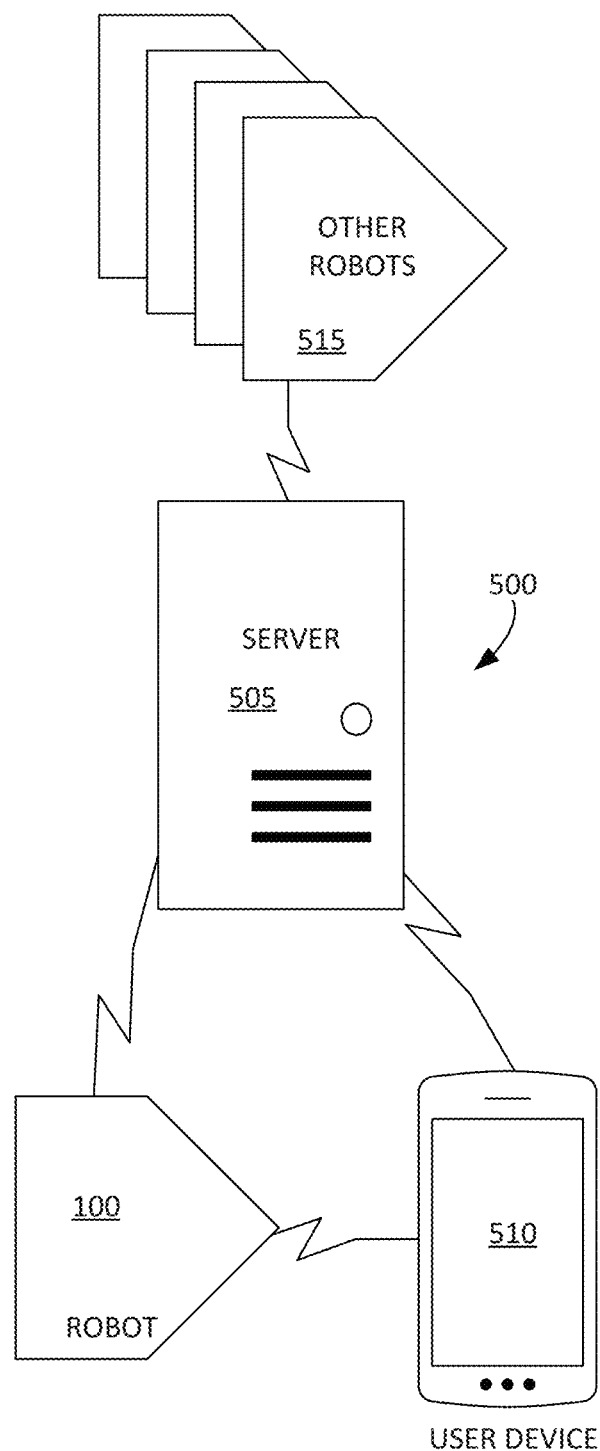
FIG. 5 illustrates a communication network including a robotic lawnmower.

The communications system 417 permits communication between the robotic lawnmower 100 and other devices such that the robotic lawnmower 100 communicates data pertaining to detected vegetation characteristics to the other devices and receive information that the electronic processor 415 uses to control operations of the robotic lawnmower 100. Referring to FIG. 5, a network 500 includes the robotic lawnmower 100, a server 505, a user device 510 (e.g., the remote device 116 of FIG. 1), and other robotic lawnmowers 515. The network 500 also includes other user devices operable with the other robotic lawnmowers 515. In some implementations, the other robotic lawnmowers 515 are each associated with other mowable areas.

The robotic lawnmower 100, using its communications system 417, forms a wireless connection with the server 505 so that the robotic lawnmower 100 is capable of communicating with the server 505. The robotic lawnmower 100 also forms a wireless connection with the user device 510 to enable communication between the user device 510 and the robotic lawnmower 100.

The server 505 collects and stores information pertaining to mowable areas and communicates this information to other devices in the network 500, including to the robotic lawnmower 100. As described herein, the robotic lawnmower 100 uses information about fluctuating weather conditions to control various operations of the robotic lawnmower. In examples described herein, the robotic lawnmower 100 receives this information from the server 505.

The server 505 also receives data from the robotic lawnmower 100 and processes the data to generate information about vegetation of the mowable area. For example, the server 505 receives wireless signals representing the position-referenced data. The server 505 processes the wireless signals and determines the vegetation characteristics of the mowable area. Based on the vegetation characteristics, the server 505 computes a grass health score for the mowable area. The grass health score indicates an overall health of the mowable area, thus providing a metric that the user views using, for example, the user device, to determine if the mowable area may benefit from remediation to improve the health of the mowable area.

In some examples, the server 505 receives position-referenced data from the other robotic lawnmowers 515 and performs similar computations of the grass health scores for the other mowable areas associated with the other robotic lawnmowers 515. The server 505 compares the grass health score of the mowable area associated with the robotic lawnmower 100 to the grass health scores of the other mowable areas and transmits data representing the comparison to the user device 510. To allow the user to view the comparison, the user device 510 displays the comparison to inform the user of the health his or her mowable area relative to other mowable areas.

The network 500, during use, implements processes to facilitate improved control of the robotic lawnmower 100 and to provide the user with recommendations to improve vegetation health. Generally, the different devices in the network 500, including the robotic lawnmower 100, the server 505, the user device 510, the other robotic lawnmowers 515, and other user devices communicate information and data with one another. Each device in the network 500 generates data, processes data, transmits/receives data, and accordingly adjusts operations based on the data. The robotic lawnmower 100 modifies its mowing operations based on that information and data. In some cases, the user device 510 visualizes the information and data so that the user may easily understand the status of vegetation (e.g., vegetation health, color, height, and moisture content) in his or her lawn or mowable area. The user device 510 further provide recommendations to the user, and the user, using the user device 510, responds by confirming or denying implementation of those recommendations. These various control and recommendation processes are described herein.

Figure 6:
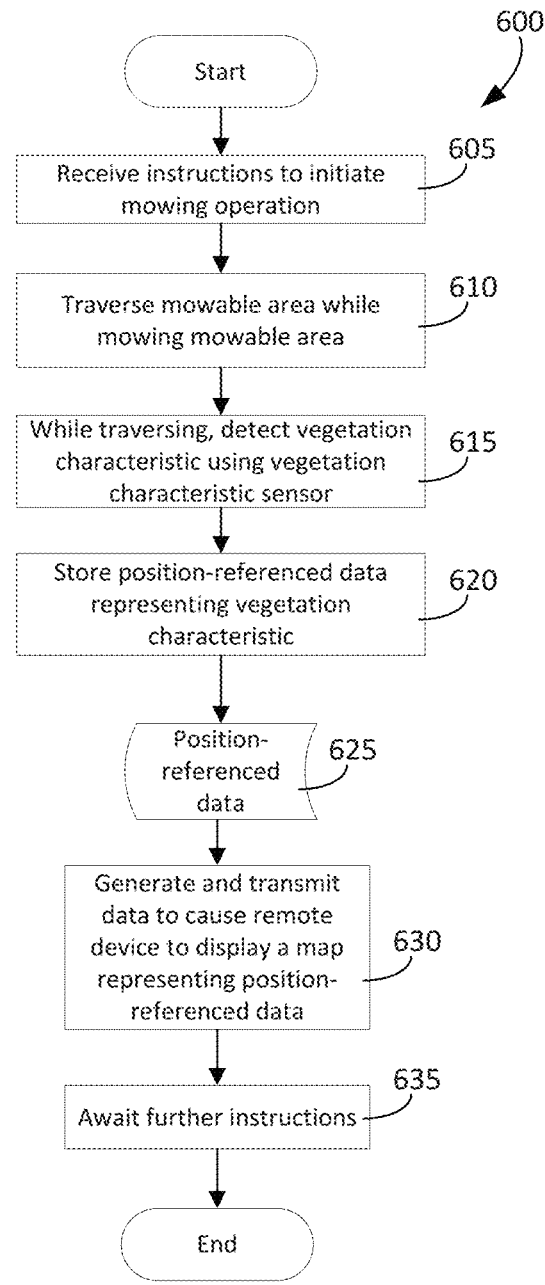
FIG. 6 is a flow chart of a process to generate position-referenced data and to cause a user device to display a color-coded map.

FIG. 6 illustrates a flow chart of an example process 600 that includes operations implemented by the electronic processor of the robotic lawnmower to cause the remote device (e.g., the user device 510 of FIG. 5) to display a map including information about vegetation in a mowable area. The map is color-coded or marked in such a way to show variation in vegetation characteristics in the different portions of the mowable area, though in other implementations, other visual representations are used to indication variations in the mowable area.

The process 600 begins at operation 605 when the electronic processor receives instructions to initiate a mowing operation. At operation 610, the electronic processor causes the robotic lawnmower to traverse the mowable area while mowing. The electronic processor operates the drive wheels to cause the robotic lawnmower to move about the mowable area. To mow vegetation, the electronic processor also operates the grass cutter.

At operation 615, the electronic processor causes the robotic lawnmower to detect one or more vegetation characteristics while the robotic lawnmower traverses the mowable area. The electronic processor activates the vegetation sensors of the robotic lawnmower to detect the vegetation characteristics. As described herein, the electronic processor activates the appropriate sensor (e.g., the pressure sensor, the optical sensor, the capacitance sensor, a camera) based on the vegetation characteristic that the electronic processor seeks to detect. The vegetation sensors, upon detecting vegetation characteristics, generate sensor data. To determine a position of the robotic lawnmower, the electronic processor also activates the position sensing system, which generates position data. Based on the sensor data and the position data, the electronic processor generates position-referenced data.

During the operation 615, the electronic processor causes the robotic lawnmower to traverse the mowable area such that the lawnmower covers the mowable area along its path. As a result, during the robotic lawnmower's travels, the vegetation sensors of the robotic lawnmower detects vegetation characteristics of the vegetation in the mowable area throughout the entire mowable area.

At operation 620, the electronic processor stores the position-referenced data 625, which represents the vegetation characteristic at locations throughout the mowable area. The electronic processor stores the position-referenced data 625 in memory. In some cases, the electronic processor, using the communications system, transmits the position-referenced data to a remote server where the position-referenced data 625 is stored and retrieved for future use.

In some cases, instead of receiving instructions to initiate the mowing operation at the operation 605, the process 600 begins when the electronic processor receives instructions to initiate a non-mowing movement operation. At operation 610, the electronic processor thus causes the robotic lawnmower to traverse the mowable area without mowing. The electronic processor causes the robotic lawnmower to traverse the mowable area on one date during operation 610. During the robotic lawnmower's travel across the mowable area, the electronic processor generates the position-referenced data 625, which is usable to perform the operations to improve grass health described herein. Following the robotic lawnmower's travel across the mowable area, the electronic processor controls the robotic lawnmower to mow the mowable area on another date, based on the position-referenced data 625.

Figure 7A:
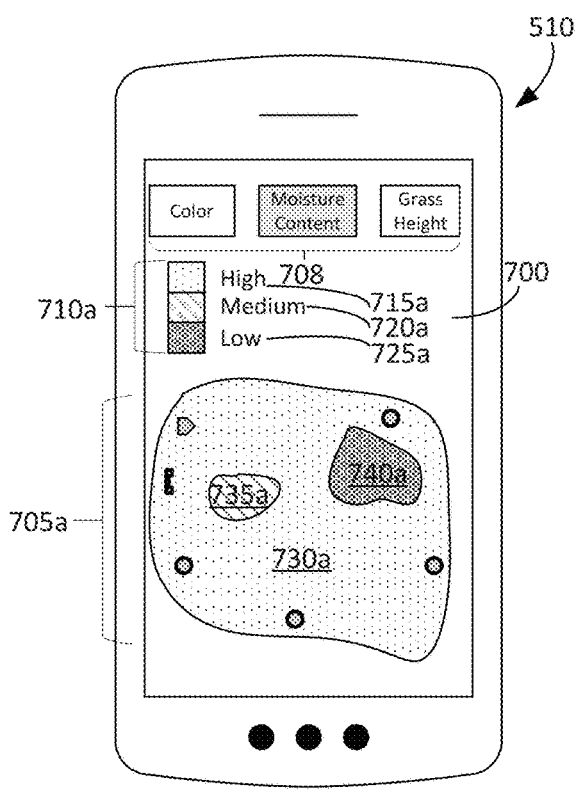
FIGS. 7A to 7C each depicts a user device displaying the color-coded map referenced in FIG. 6.
Figure 7B:
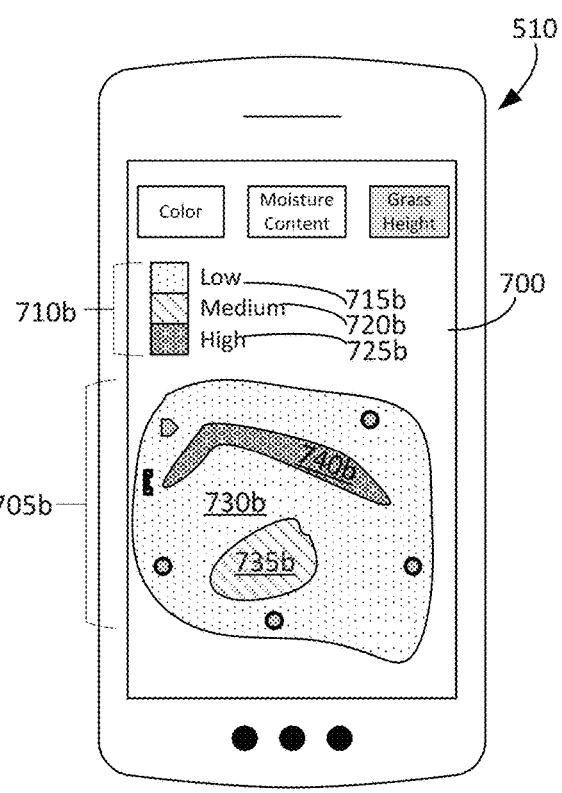
Figure 7C:
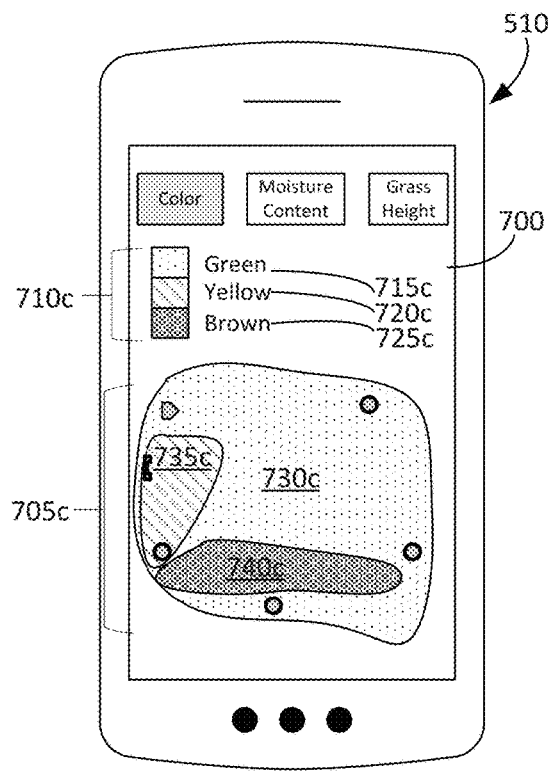

The stored position-referenced data 625 is used to generate information for use by, for example, the server 505 and the user device 510 of FIG. 5. In the example of the process 600 depicted in FIG. 6, the electronic processor processes the stored position-referenced data 625 to generate user interface data that causes the user device 510 to display a map of variation of vegetation characteristics throughout the mowable area. FIGS. 7A to 7C depict various maps of the mowable area displayed on the user device 510. The maps depict the geography of the mowable area including the boundary. Each map includes indicators of variation of the vegetation characteristic, such as a color coded visualization of variation of a vegetation characteristic throughout the mowable area (e.g., moisture content, grass height, and color). These maps provide the user with a convenient visual tool to determine portions of the mowable area that may require lawn care to improve the health of those portions. The user device 510 includes a user interface 700 that displays a map of the mowable area 102 (shown in FIG. 1). In cases where there are multiple maps of different vegetation characteristics, the user toggles between maps 705a, 705b, 705c of different vegetation characteristics by invoking buttons 708. In some examples, the maps 705a, 705b, 705c also show locations of the robot, the beacons, and the docking station.

Maps 705a, 705b, 705c are color coded to depict the variation of the vegetation characteristics throughout the mowable area. Legends 710a, 710b, 710c indicate the meaning of each of the colors used in the maps 705a, 705b, 705c, respectively. In these examples, legends 710a, 710b, 710c each includes three levels for each vegetation characteristic. The levels are displayed in different colors, shading, patterns, marked with contour lines, or in other distinguishing indicators.

Each level shown in the legends 710a, 710b, 710c corresponds to a different range of the vegetation characteristic. The ranges corresponding to each level are, for example, predetermined and set such that each level indicates the amount of attention the user should provide to portions of the maps 705a, 705b, 705c marked with that level. In some cases, one level indicates that the vegetation characteristic is in a desired range (e.g., a healthy range) for a portion of the mowable area, so the user accordingly does not have to perform remediation to the improve the vegetation characteristic in that portion. The desired range is a range that includes or is close to baseline data for the vegetation characteristic. The baseline data includes the typical values for a vegetation characteristic considered to be healthy, aesthetically appealing, or appropriate for operations of the robotic lawnmower. The server transmits the baseline data to the robotic lawnmower so that the robotic lawnmower appropriately adjusts mowing operations based on the baseline data. In addition to the level indicative of the vegetation characteristic being in the desired range, another level indicates that the vegetation characteristic is below the desired range but may require observation to ensure that the vegetation characteristic does not further degrade. Yet another level indicates that the vegetation characteristic is significantly below the healthy range, and the user should remediate the portion having that level to prevent damage to that portion of the mowable area, improve health of that portion, improve aesthetics of the portion, or improve performance of the robotic lawnmower.

Referring back to FIG. 6, the electronic processor generates the user interface data to display the maps. At operation 630, the electronic processor uses the position-referenced data 625 to generate the user interface data usable by the user device to display the map representing the position-referenced data 625. The user interface data causes the user device to display a map including information based on the position-referenced data. In this regard, the maps include information pertaining to variation in vegetation characteristics of the mowable area. During the operation 630, the electronic processor assigns the levels to the position-referenced data. The electronic processor compares the position-referenced data to the baseline data to assign the position-referenced data to the various levels.

Different examples of the levels of vegetation characteristics described herein are explained in detail with respect to FIGS. 7A to 7C. FIG. 7A depicts the map 705a coded to depict the variation of moisture content throughout the mowable area. In the example of FIG. 7A, the sensor data collected at the operation 615 of FIG. 6 represents the moisture content of the vegetation of the mowable area referenced to corresponding position data. The sensor data is collected using the capacitance sensor or other sensor configured to detect moisture content of underlying vegetation. As a result, at operation 630 of FIG. 6 the electronic processor compares the position-referenced data 625 to baseline data for moisture content of healthy vegetation. The legend 710a of FIG. 7A shows three different levels 715a, 720a, and 725a of moisture content, each of which is determined at operation 630 of FIG. 6, based on the baseline data.

Different portions of the map 705a are marked to indicate the level of moisture content of the corresponding portions of the mowable area. The map 705a depicts a portion 730a with a color corresponding to the high level 715a of moisture content. The marking of portion 730a indicates that the corresponding portion of the mowable area has a high level of moisture content. Similarly, the map 705a depicts a portion 735a with a marking corresponding to the medium level 720a of moisture content. The marking of portion 735a indicates that the corresponding portion of the mowable area has a medium level of moisture content. The map 705a further depicts a portion 740a with a marking corresponding to the low level 725a of moisture content. The marking of the portion 740a indicates that the corresponding portion of the mowable area has a low level of moisture content.

The moisture content of the vegetation of the mowable area depends on the amount of water that the user provides to the mowable area. Some areas may require more or less water due to environmental conditions (e.g., shade, soil conditions, etc.), or due to the type or density of grass or other vegetation. The elevation of a portion of the mowable area relative other portions can also influence moisture content. For example, raised portions may be more prone to dryness because water placed in those portions tend to move toward lower lying areas. As the robotic lawnmower traverses the mowable area and detects the moisture content, the robotic lawnmower can detect a wide variation of moisture content.

The high level 715a of moisture content indicates that the moisture content is within the desired range defined by the baseline data. The portion 730a does not require remediation from the user to improve the moisture content in the portion of the mowable area 102 corresponding to the portion 730a of the map 705a.

The medium level 720a indicates that the moisture content is slightly below the desired range. While the portion 735a having the medium level 720a of the moisture content is below the desired or healthy range, the moisture content of the portion of the mowable area 102 corresponding to the portion 735a of the map 705a may not require immediate attention. The user may not immediately need to attend to the portion of the mowable area corresponding to the portion 735*a*.

The low level 725*a* indicates that the moisture content is significantly below the desired or healthy range. As a result, the user should immediately implement remediation efforts to improve the moisture content in the portion of the mowable area corresponding to the portion 740*a* of the map 705*a*. For example, to improve moisture content, the user increases watering frequency of this portion of the mowable area.

While the example described with respect to FIG. 7A generally indicates the higher levels of moisture content are within the desired range, in some cases, the moisture content exceeds the desired range and be considered unhealthy or too wet for acceptable mowing. As such, the legend 710*a* additionally includes a level corresponding to moisture content that is too high. The user may attend to the portions of the mowable area having moisture content that is repeatedly too high, such as by watering those portions at a lower frequency.

The user device 510 also displays the map 705*b* showing variation of grass height of the vegetation in the mowable area, as shown in FIG. 7B. In the example of FIG. 7B, the sensor data collected at the operation 615 of FIG. 6 corresponds to sensor data generated by sensors configured to detect grass height of vegetation underlying the robotic lawnmower, such as a vegetation pressure sensor. In some implementations, the sensor data collected corresponds to an amount of power expended as the robotic lawnmower 100 moves across the mowable area. The power expended to traverse a portion of the mowable area, for example, increases as the grass height of the vegetation in that portion increases. Based on a height of the grass cutter and the power expended, the robotic lawnmower estimates the grass height of the vegetation. The stored position-referenced data—computed based on the sensor data and the position data—represents the grass height of the vegetation of the mowable area referenced at corresponding locations throughout the mowable area. The legend 710*b* indicates the meaning of each of the markings used in the map 705*b*. The legend 710*b* includes three levels 715*b*, 720*b*, 725*b* of grass height: a low level 715*b*, a medium level 720*b*, and a high level 725*b*.

Different portions of the map 705*b* are marked to indicate the level of grass height of the corresponding portions of the mowable area. The map 705*b* depicts a portion 730*b* with a marking corresponding to the low level 715*b* of grass height. The marking of the portion 730*b* indicates that the corresponding portion of the mowable area has a low level of grass height. Similarly, the map 705*b* depicts a portion 735*b* with a marking corresponding to the medium level 720*b* of grass height. The marking of the portion 735*b* indicates that the corresponding portion of the mowable area has a medium level of grass height. The map 705*b* further depicts a portion 740*b* with a marking corresponding to the high level 725*b* of grass height. The color of the portion 740*b* indicates that the corresponding portion of the mowable area has a high level of grass height.

In some examples, the grass height throughout the mowable area varies due to the frequency of mowing operations executed by the robotic lawnmower and due to grass growth rates. The grass growth rates can depend on the amount of nutrients that the vegetation in different portions of the mowable area receives. Other factors influencing grass height can include the type of vegetation, presence of animals, and presence of movable objects on portions of the mowable area that inhibit growth. The robotic lawnmower, during the operations described herein, detects the varied grass heights.

In some examples, the low level 715*b* of grass height indicates that the grass height is within the desired range. The portion 730*b* does not require remediation from the user to better maintain grass heights within desired ranges in the portion of the mowable area corresponding to the portion 730*b* of the map 705*b*. In some cases, the mowing frequency for the portion 730*b* is occurring at an appropriate frequency that the user does not need to modify.

In some examples, the medium level 720*b* indicates that the grass height is slightly greater than the desired range. While the portion 735*b* having the medium level 720*b* of the grass height is below the desired range, the grass height of the portion of the mowable area corresponding to the portion 735*b* of the map 705*b* may not require immediate attention. The user may not immediately need to remediate operations of the robotic lawnmower (e.g., increasing mowing frequency) around the portion of the mowable area corresponding to the portion 735*b*. In some cases, the grass height is not sufficiently high to warrant a greater mowing frequency.

In some examples, the high level 725*b* indicates that the grass height is significantly below the desired range. The portion 740*b* having the high level 725*b* of the grass height is well above the desired range. As a result, the user should immediately implement remediation efforts to reduce grass height in the portion of the mowable area corresponding to the portion 740*b* of the map 705*b*. For example, the user interacts with the user device 510 to transmit instructions to the robotic lawnmower to increase frequencies of mowing operations within the portion of the mowable area corresponding to the portion 740*b*.

While the example described with respect to FIG. 7B generally indicates that the lower levels of grass height are within the desired range, in some implementations, the grass height is even lower than the desired range. For example, the vegetation in a particular portion of the mowable area may not be growing fast enough or may be becoming sparser due to unhealthy conditions for the vegetation. As such, the legend 710*b* additionally includes a level corresponding to grass height that is too low. The user remediates the portions of the mowable area having grass height that is too low by, for example, watering those portions more frequently, providing additional nutrients (e.g., by adding fertilizer), or reducing the mowing frequency in those portions.

In another example, the user device 510 also displays the map 705*c* showing variation of color of the vegetation (also referred to as vegetation color) in the mowable area, as shown in FIG. 7C. In the example of FIG. 7C, the sensor data collected at the operation 615 of FIG. 6 corresponds to sensor data generated by one or more sensors configured to detect the color of vegetation underlying the robotic lawnmower, such as an optical sensor. The stored position-referenced data represents the vegetation color of the mowable area at locations throughout the mowable area. The legend 710*c* indicates the meaning of each of the markings used in the map 705*c*. The legend 710*c* includes three levels 715*c*, 720*c*, 725*c* of grass height: a green level 715*c*, a yellow level 720*c*, and a brown level 725*c*.

Different portions of the map 705*c* are coded to indicate the level of vegetation color of the corresponding portions of the mowable area. The map 705*c* depicts a portion 730*c* with a code corresponding to the green level 715*c* of vegetation color. Similarly, the map 705*c* depicts a portion 735*c* with a code corresponding to the yellow level 720*c* of vegetation color. The map 705c further depicts a portion 740c with a code corresponding to the brown level 725c of vegetation color.

The vegetation color throughout the mowable area varies due to, for example, the frequency of mowing operations executed by the robotic lawnmower, the frequency at which the user waters the mowable area, as well as environmental conditions (e.g., soil conditions, lighting conditions, etc.). Vegetation color is affected by, for example, the sharpness of the cutting blades of the robotic lawnmower's grass cutter. Duller cutting blades may result in browner vegetation. In addition, vegetation cut too short may also result in browner vegetation. The grass growth rates further depend on other factors, such as the amount of nutrients that the vegetation in different portions of the mowable area receives. The robotic lawnmower, during the operations described herein, detects the variations in the vegetation color throughout the mowable area.

In some examples, the green level 715c of vegetation color indicates that the vegetation color is within the desired range for vegetation color. In some cases, based on the sensor data from the color sensor, the electronic processor translates the sensor data into a numeric representation of the vegetation color, and processor compares the number representative of vegetation color to threshold values indicative of waning health and poor health, values that would require user intervention. For example, the electronic processor converts the vegetation color into an RGB triplet (r, g, b). The portion 730c does not require remediation from the user to maintain vegetation color within desired ranges. For example, because further remediation is not required, the user is providing water to the portion 730c at appropriate frequencies.

In some examples, the yellow level 720c indicates that the vegetation color is less green than the desired range. While the portion 735c having the yellow level 720c of the vegetation color is outside of the desired range, the vegetation color of the portion of the mowable area corresponding to the portion 735c of the map 705c may not require immediate attention. The user may not immediately need to adjust, for example, watering frequency in the portion of the mowable area corresponding to the portion 735c. For example, the vegetation color is not sufficiently outside of the desired range to warrant an increase in watering frequency.

In some examples, the brown level 725c indicates that the vegetation color of portion 740c is significantly outside of the desired range. As a result, the user should immediately implement remediation efforts to improve vegetation color, and thus grass health, in the portion of the mowable area corresponding to the portion 740c. For example, the user transmits instructions from the user device 510 to the robotic lawnmower to decrease frequencies of mowing operations within portion 740c. The user additionally or alternatively increases watering frequency within that portion. In some examples, the brown level 725c is a seasonal indication of leaf build-up, thus causing the robotic lawnmower to prompt the user that the specified area of the lawn requires leaf clean-up.

While the example described with respect to FIG. 7C generally indicates that the greener levels of vegetation color are within the desired range, in some cases, the vegetation color is greener than the desired range. The vegetation in a particular portion of the mowable area is receiving too much nitrogen, for example. As such, the legend 710c additionally includes a level corresponding to vegetation color that is too green. The user remediates the portions of the mowable area having vegetation color that is excessively green by, for example, decreasing use of fertilizer, or increasing the mowing frequency in those portions.

Figure 8:
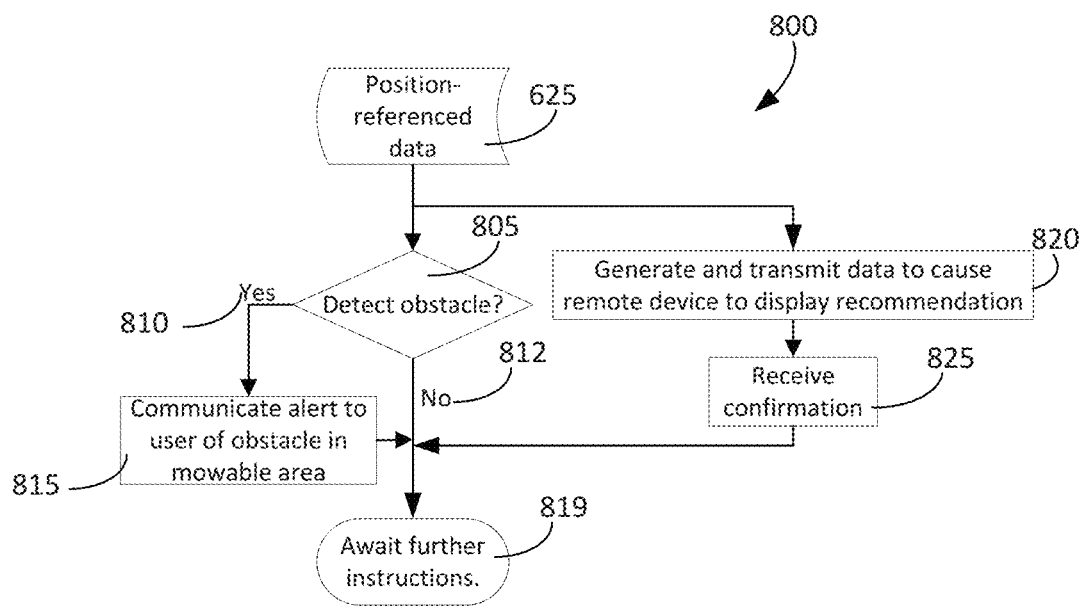
FIG. 8 is a flow chart of a process using position-referenced data to communicate alerts and recommendations to a user device.

In some implementations, the electronic processor of the lawnmower generates additional user interface data that includes other information in addition the maps described with respect to FIGS. 6 and 7A to 7C. As depicted in FIG. 8, using the stored position-referenced data 625—which are generated using, for example, the operations 605, 610, 615, 620 of the process 600 of FIG. 6—the electronic processor implements a process 800 to communicate alerts and recommendations to the user device 510. The user device 510 provides recommendations that the user, for example, adjusts operations of the robotic lawnmower or adjusts lawn care strategies (e.g., watering frequency, fertilization frequency) of the mowable area. In some examples, the user device 510 also directs the user's attention to particular portions of the mowable area.

Figure 9A:
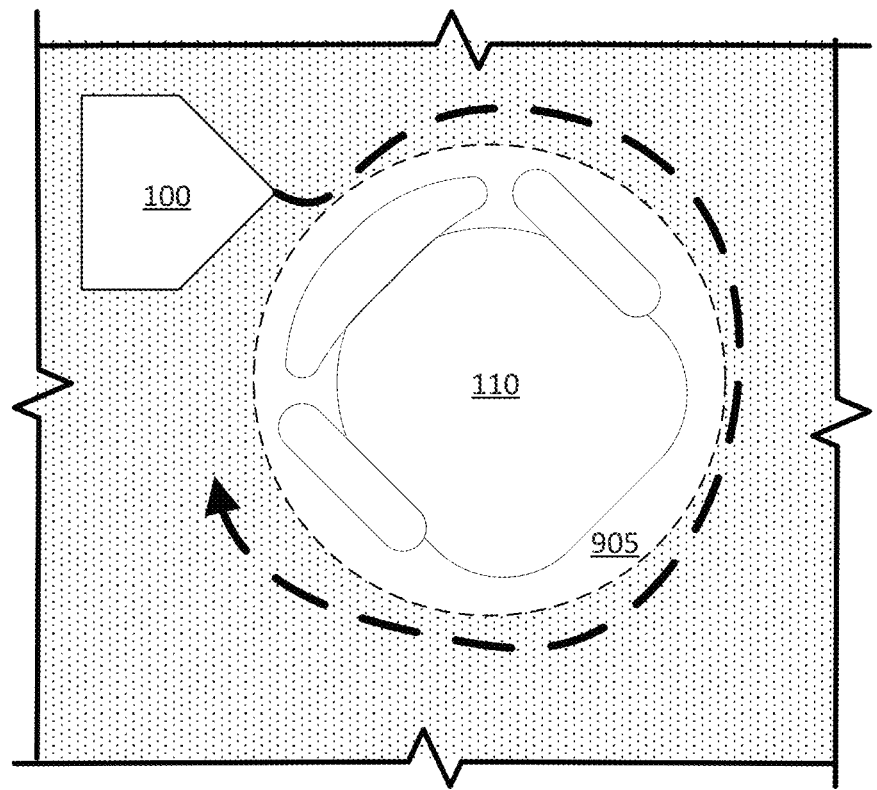
FIG. 9A shows the robotic lawnmower traversing a portion of the mowable area of FIG. 1.

While controlling the robotic lawnmower to traverse the mowable area in the operation 610 of FIG. 6, the electronic processor at operation 615 uses sensors of the robotic lawnmower to sense a movable obstacle encountered by the robotic lawnmower. Referring to FIG. 9A, the lawn chair 110 (as also depicted in FIG. 1) is a movable obstacle that prevents the robotic lawnmower 100 from reaching a portion 905 of the mowable area 102 that the lawn chair 110 covers. After the lawnmower senses the movable obstacle, the electronic processor stores position-referenced data related to the sensed obstacle.

Using the stored position-referenced data, at operation 805 of FIG. 8 the electronic processor determines whether the sensed obstacle should be considered a movable, rather than a permanent, obstacle. For example, the electronic processor compares the stored position-referenced data related to the sensed obstacle with previously stored position-referenced data generated during previous mowing or boundary teach operations. (A boundary teach operation is one in which the robot is user-guided around a mowable area to establish position data for a perimeter boundary and/or bounded, non-mowable areas, such as flower beds.) In some examples, the electronic processor detects a difference between the position-referenced data related to the sensed obstacle and the previously stored position-referenced data and then determines that the recently stored position-referenced data does not include entries for positions for which there is previously stored data at the location of the sensed obstacle. At operation 810, the electronic processor thus determines that the robotic lawnmower has detected an obstacle which is movable. At operation 815, the electronic processor communicates an alert to the user device to inform the user of the difference detected at the operation 810. The alert indicates the presence of the movable obstacle (e.g., the lawn chair 110 of FIG. 9A) in the mowable area.

Figure 9B:
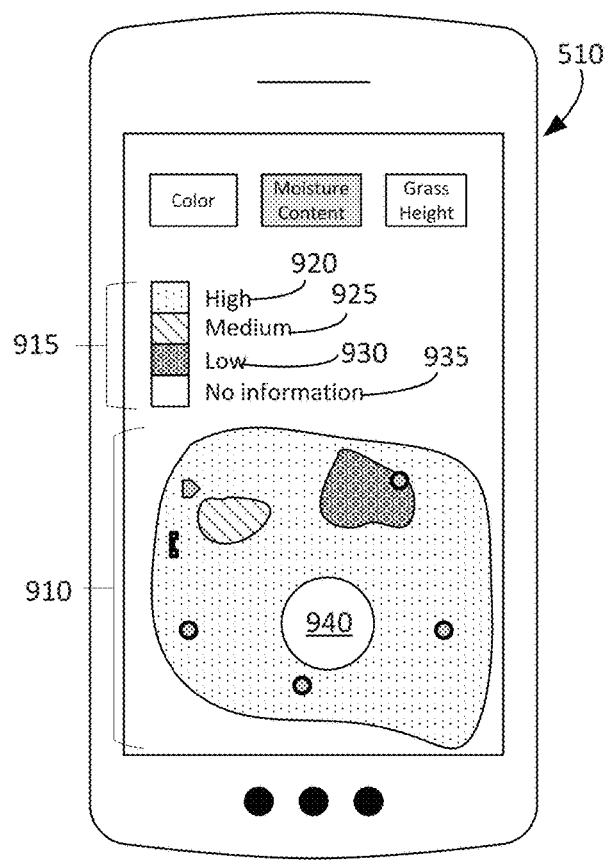
FIG. 9B depicts a user device displaying a color-coded map.

In some examples as depicted in FIG. 9B, the electronic processor transmits user interface data to display a map 910 of the vegetation characteristic, which are produced using, for example, the operations 630, 635 of the process 600. In FIG. 9B, the vegetation characteristic is moisture content, although alternatively or additionally, the vegetation characteristic is vegetation color, grass height, or other appropriate vegetation characteristics. A legend 915 describing the color code of the map 910 includes the three levels 920, 925, 930, as described in detail with respect to FIGS. 7A to 7C. The legend 915 additionally includes a no-information level 935. A portion 940 of the map 910 is marked with the no-information level 935, indicating that the electronic processor did not generate position-referenced data for the portion 940 during the most recent operation. The absence of position-referenced data for portion 940, in this case, occurred due to the presence of the lawn chair 110 of FIG. 9A, which prevented the vegetation sensors from detecting the characteristics of vegetation underlying the lawn chair.

Figure 9C:
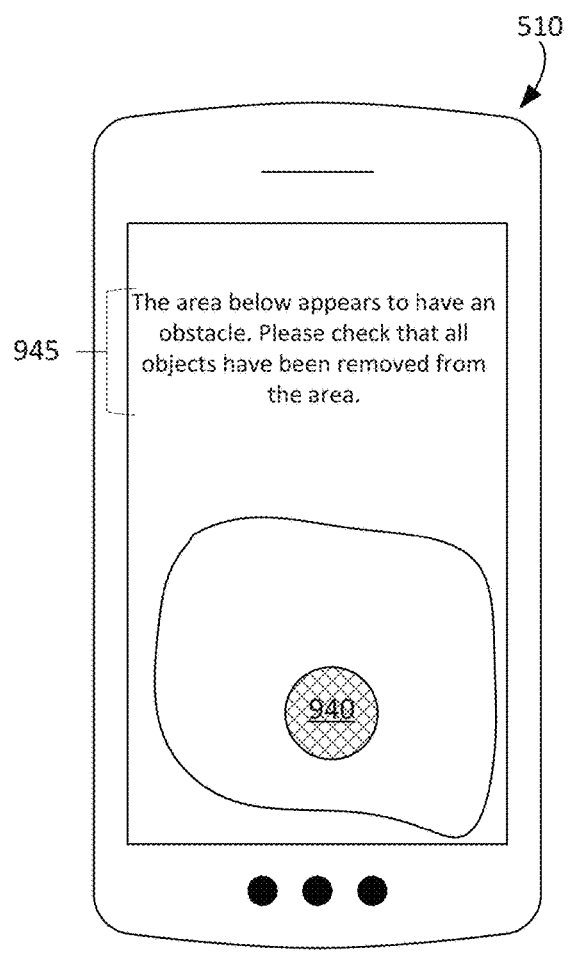
FIG. 9C depicts a user device displaying a recommendation.

In some implementations, the electronic processor also transmits user interface data to cause the user device 510 to display an alert indicating to the user the detection of a movable obstacle (e.g., a lawn chair). As shown in FIG. 9C, the user device 510 displays a message 945 that recommends that the user examine the portion of the mowable area corresponding to portion 940 indicated on the map. The user device 510 instructs the user to check for any objects in the portion 940 and to remove any objects from that portion.

In some implementations, the user uses the user device 510 to indicate that the object is a permanent object that the user does not intend to remove from the mowable area (e.g., a fountain, a large bench, or other permanent lawn fixture). The electronic processor receives the indication that the object is a permanent object and accordingly stops sending alerts during future mowing operations in which the electronic processor determines an absence of position-referenced data in the portion corresponding to the location of the permanent object. The electronic processor instructs the robotic lawnmower to remember the location of the permanent object, and based on the location of the permanent object, instruct the robot to reduce its speed as it approaches the obstacles so as to avoid high speed contact with the permanent object.

While the electronic processor, in the example of detecting the lawn chair 110 described with respect to FIGS. 8 and 9A to 9C, is described to use an absence of position-referenced data to determine the presence of the lawn chair 110, in some examples the robotic lawnmower additionally or alternatively includes bump sensors, range finders, and other proximity sensors to detect the presence of an obstacle. In some implementations, the electronic processor marks the entries of the position-referenced data in which the robotic lawnmower detects an obstacle. The electronic processor then defines a perimeter of portion 940 by marking the position-referenced data corresponding to triggering of the proximity sensors. The electronic processor 415 transmits the alert indicating the portion 940 to require inspection from the user.

In addition or as an alternative to providing recommendations regarding movable obstacles in the mowable area, the electronic processor provides recommendations to the user to modify mowing operations and user lawn care operations. In some implementations, the electronic processor generates a lawn care recommendation based on the position-referenced data and send the lawn care recommendation to the user device to cause the user device to display the lawn care recommendation. At operation 820 of FIG. 8, based on the stored position-referenced data, the electronic processor generates and transmits user interface data to cause the user device to display a recommendation to modify various operations. Based on the vegetation characteristics, the electronic processor issues a recommendation to water portions of the mowable area, to fertilize portions of the mowable area, to re-seed portions of the mowable area, to modify a mowing frequency in which the robotic lawnmower mows the mowable area or portions of the mowable area, among other appropriate recommendations to modify operations to care for the mowable area. These recommendations can improve the vegetation characteristics, thus improving overall health and aesthetic of the mowable area.

After the user device displays the recommendations, in some examples, the user interacts with the user device to confirm implementation of the recommendation or to instruct the robotic lawnmower to modify its mowing operation according to the recommendation. Thus, at operation 825 of FIG. 8, the electronic processor receives the confirmation from the user device. As described with respect FIGS. 10A to 10C, the confirmation causes the electronic processor to modify various operations of the robotic lawnmower, including, for example, a mowing schedule. The electronic processor then, at operation 819, awaits further instructions. In some implementations, the electronic processor, at operation 812, does not detect an obstacle and thus awaits further instructions at operation 819.

Figure 10A:
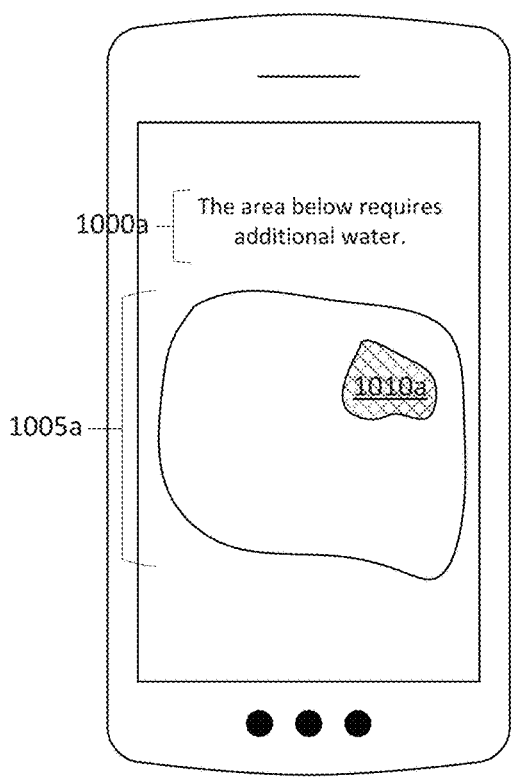
FIGS. 10A to 10C each depicts the user device displaying a specific recommendation generated by the mowing system.
Figure 10B:
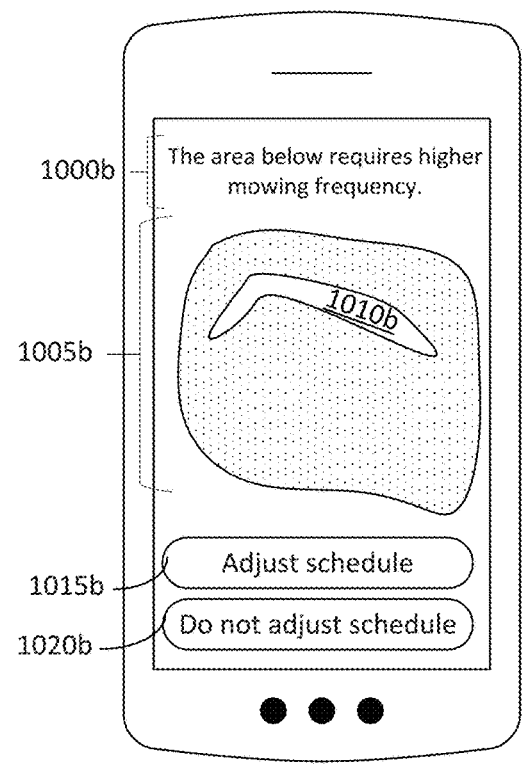
Figure 10C:
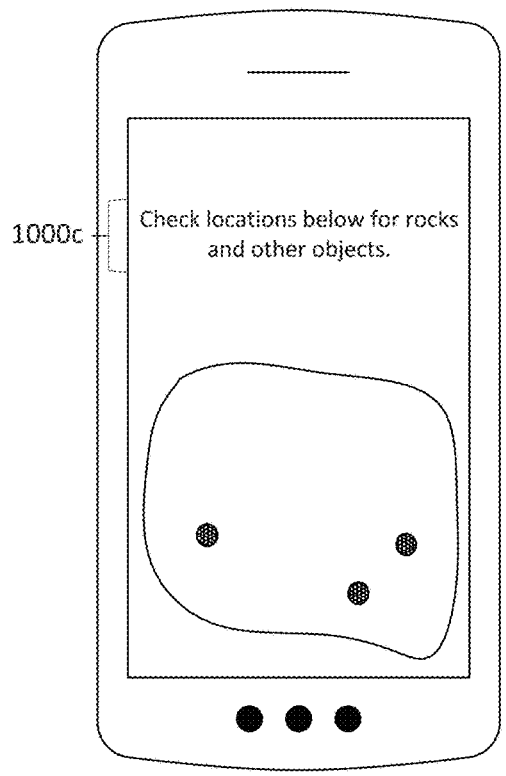

FIGS. 10A to 10C depict various recommendations that the electronic processor may cause the user device to display. As shown in FIG. 10A, in some examples, the user interface data causes the user device to display a recommendation 1000a to increase a watering frequency or a fertilization frequency of a portion of the mowable area. The recommendation 1000a includes a map 1005a with a marked portion 1010a that indicates the portion of the mowable area that requires more frequent watering or fertilization.

To determine that the portion of the mowable area corresponding to the portion 1010a requires a greater watering or fertilization frequency, the electronic processor uses the position-referenced data associated with, for example, the color or the moisture content of the vegetation of the mowable area. Because the position-referenced data are based on both the position data and the sensor data from the vegetation sensors, the electronic processor indicates a location along the mowable area corresponding to vegetation characteristics in undesirable ranges. Based on the particular vegetation characteristic (e.g., grass height, color, moisture content) that is below desirable ranges, the electronic processor provides the recommendation 1000a. As described with respect to FIG. 7A, the position-referenced data indicates that the portion 740a on the map 705a corresponds to a portion of the mowable area having the low level 725a of moisture content. In this example, in response to the low level 725a of moisture content, the electronic processor causes the user device to recommend remediation efforts— including, for example, greater watering frequency—to increase the moisture content of that portion of the mowable area. As shown in FIG. 10A, the recommendation 1000a includes the following statement along with the map 1005a: "The area below requires additional water."

In one implementation, the electronic processor further causes the user device to display a request for confirmation of increased watering frequency. The electronic processor communicates with an automated irrigation system (e.g., directly or through a remote server) to cause the automated irrigation system to increase or decrease the watering frequency in the portion of the mowable area corresponding to the portion 1010a. Receiving the confirmation from the user device causes the electronic processor to transmit instructions to the automated irrigation system to cause the automated irrigation system to increase or decrease the watering frequency, depending on the recommendation provided by the electronic processor.

In some examples, the electronic processor determines that the portion of the mowable area does not have a color in the desired or healthy range (e.g., as described with respect to the portion 740c of FIG. 7C). The electronic processor displays a recommendation to increase nutrients in the portion of the mowable area by increasing an amount of fertilizer applied to the portion or the frequency at which fertilizer is applied to the portion.

In some cases, the user confirms implementation of the recommendations proposed by the electronic processor, and in response to the confirmation, the electronic processor temporarily modifies mowing operations or schedules to maintain the vegetation health in the mowable area. For example, if the user confirms that additional water, fertilizer, or vegetation seeds have been provided in a portion of the mowable area, the electronic processor modifies the mowing schedule such that the robotic lawnmower does not mow that portion for a predefined duration of time (e.g., 3 to 7 days). The modified schedule allows the remedial efforts taken by the user to take effect without increasing the risk that a mowing operation may reverse those efforts.

In further examples, as shown in FIG. 10B, the user interface data causes the user device to display a recommendation 1000b to increase or decrease a mowing frequency of a portion of the mowable area. As shown in FIG. 7B, the electronic processor determines that the grass height in the portion of the mowable area corresponding to the portion 740b on the map 705b is above the desired range. Based on that determination, the electronic processor causes the user device to display the recommendation 1000b to display a map 1005b that directs the user's attention to a portion 1010b. The portion 1010b corresponds to the portion of the mowable area requiring a greater mowing frequency.

The electronic processor further causes the user device to display a button 1015b requesting confirmation. After the user invokes the button 1015b, the electronic processor receives the confirmation and, in some cases, adjusts the mowing schedule stored on the memory of the robotic lawnmower. For example, the electronic processor modifies the mowing schedule such that the number of mowing operations that the robotic lawnmower performs per week increases from 1 to 2, 2 to 3, 3 to 4, etc. The user device also displays button 1020b that the user invokes in order to decline adjusting the mowing schedule.

In another example, as shown in FIG. 10C, the user interface data causes the user device to display a recommendation 1000c to check various locations throughout the mowable area for objects, such as rocks and debris that cause strike the grass cutter of the robotic lawnmower. As described herein, in some implementations, the vegetation sensors includes a power sensor to monitor the amount of power expended by the grass cutter. While the amount of power can directly correlate with the grass height of the vegetation in the mowable area, in some examples, the power also increases (e.g., experience a spike) due to the impact of the grass cutter against rocks and debris. The electronic processor determines that these spikes in power expended by the grass cutter exceed a threshold power, e.g., 2 to 5 times above the average power expended while mowing. In some cases, the threshold power is a predetermined quantity stored in memory. The predetermined quantity is, for example, the power typically expended to mow a mowable area having a particular grass height (e.g., 10 centimeters to 30 centimeters in height). In some implementations, the electronic processor determines a rate of change of the power expended over time, and the electronic processor determines if the rate of change exceeds a threshold rate of change, indicating that the grass cutter may have struck an object.

In some implementations, the electronic processor distinguishes between different causes of the greater power expended. The greater power expended is due to events such as those that typically result in sharper increases in power expended, such as grass growth caused by an increase in precipitation. When the vegetation characteristics appear to cause the increased power expenditure, the electronic processor provides a recommendation to increase the mowing frequency. The greater power expended is sometimes caused by situations that typically result in gradual increases in power expended, such as repetitive use. The power expended may increase above a replacement value in which the electronic processor issues a recommendation to the user device for the user to replace blades of the grass cutter. In further examples, the electronic processor determines a gradual increase in used amount of power over several consecutive mowing operations (e.g., 5 to 10 mowing operations). If the average amount of power is greater than the replacement value, the electronic processor issues the recommendation to replace the blades.

In some examples, the electronic processor provides recommendations to adjust a mowing frequency defined by the mowing schedule without consideration of the position-referenced data. The mowing schedule includes a default frequency per week based on climate. Dryer climates may require a lower mowing frequency than wetter climates, and the default mowing frequency is initially accordingly set to be low, for example, between 2 to 3 times per week.

As an alternative or in addition to automatic implementations of mowing schedule modifications, the user is able to manually adjust the mowing frequency. In this regard, the electronic processor detects adjustments outside of recommended ranges and causes the user device to display a notification that the mowable area may benefit from a change in mowing frequency.

In some implementations, the electronic processor recommends adjustments to the time of day at which the robotic lawnmower mows. The mowable area may benefit from mowing that occurs when there is little or no dew on the vegetation. The moisture from the dew can increase a risk of disease, and, in this regard, the electronic processor causes the user device to display a recommendation to adjust mowing start times such that the robotic lawnmower mows during times that would reduce the risk of exposing the vegetation to disease.

In some implementations, the electronic processor also provides recommendations to mow the mowable area in different directions to improve health of the vegetation. The electronic processor controls the robotic lawnmower such that, for consecutive operations, the robotic lawnmower mows following ranks at different angles. The angles are selected such that they are sufficiently different to improve the vegetation health. For consecutive mowing events, the path angles are different by between 45 to 180 degrees or other appropriate angles to improve vegetation health. To provide a user with the ability to select the path angles, the electronic processor causes the user device to display mowing patterns that would promote vegetation health, and the user selects the mowing patterns that the user would consider aesthetically appealing.

FIGS. 6 and 8 describes processes 600, 800, respectively, in which the electronic processor of the lawnmower uses the position-referenced data to provide information and data to the user device. While the electronic processor is described as generating the position-referenced data 625 from the sensor data and the position data at operation 620, in some examples, a remote server (such as server 505 of FIG. 5) receives the sensor data and position data form the robotic lawnmower and then generates the position-referenced data 625. The server receives and store the position-referenced data from the electronic processor and implements the operations to cause the user device to display maps and recommendations (e.g., the maps of FIGS. 7A to 7C, and the recommendations and information of FIGS. 9B to 9C and 10A to 10C).

Figure 11:
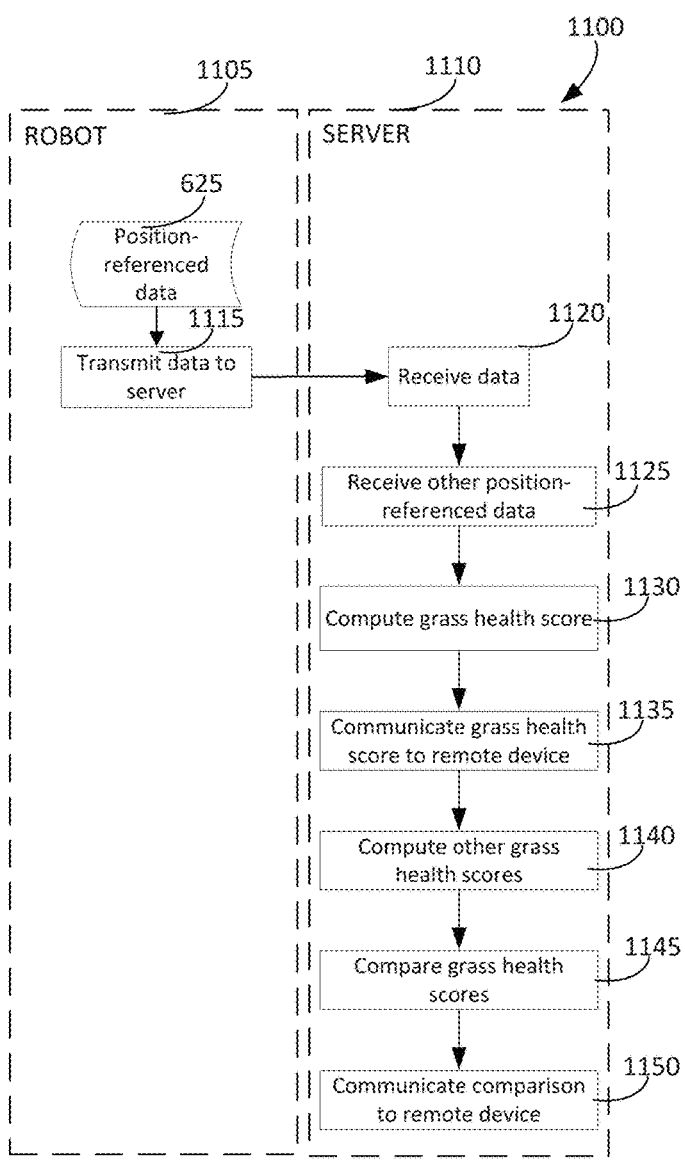
FIG. 11 is a flow chart of a process using position-referenced data to generate a grass health score and communicate a comparison of the grass health score with other grass health scores.

The user device 510 of FIG. 5 receives information and data from both the electronic processor of the lawnmower and the server 505. In addition or as alternative to the processes 600, 800 described herein in which the electronic processor outputs user interface data to the user device 510, the server 505 uses the position-referenced data in a variety of ways to provide information to the user through the user device 510. The flow chart of FIG. 11 depicts a process 1100 that causes the user device to display a comparison of a grass health score of the mowable area compared to other mowable areas. The process 1100 includes lawnmower operations 1105 and server operations 1110.

At operation 1115, the electronic processor of the robotic lawnmower, using the communications system transmits data representing the position-referenced data 625 to the server. At operation 1120, the server receives the position-referenced data 625. At operation 1125, the server receives other position-referenced data collected by other robotic lawnmowers for other mowable areas.

At operation 1130, the server calculates a grass health score for the mowable area based on the position-referenced data 625. The grass health score is a metric that the user views using the user device. The grass health score indicates the health of the mowable area and is a simple gauge for the user to determine whether the mowable area requires improved lawn care. Factors influencing health can include the vegetation characteristics described herein, including grass height, color, and moisture content. While the score is described as a grass health score, the score additionally or alternatively considers other metrics of mowable area performance. The grass health score further accounts for, for example, aesthetic appearance of the mowable area, efficiency of mowing operations across the mowable area, and other relevant lawn care characteristics.

The position-referenced data 625, as described herein, represents variation of one or more vegetation characteristics at various locations throughout the mowable area. Each of the vegetation characteristics represented in the position-referenced data 625 influences the computed grass health score. In some examples, the grass health score is a normalized weighted average of the vegetation characteristics detected by the robotic lawnmower. In some implementations, the position-referenced data 625 includes data for each of the grass height, the color, and the moisture content of the vegetation in the mowable area.

In some examples, the server computes a normalized average of each measured vegetation characteristic to a value or score between 0 and 100. For each vegetation characteristic measured across the mowable area, the server compares the position-referenced data 625 representing the vegetation characteristic to the baseline data for that vegetation characteristic. In that comparison, the server normalizes the position-referenced data 625 to the baseline data such that a score of 100 indicates that the average of the measured vegetation characteristic matches or is statistically close to the baseline data.

In some examples, the server further normalizes the position-referenced data 625 to the least healthy or least desirable measured vegetation characteristic among the other position-referenced data collected from the other robotic lawnmowers. The server normalizes the position-referenced data 625 to the vegetation characteristic represented in the other position-referenced data that has the greatest absolute difference from the baseline data. As a result, for each vegetation characteristic of the position-referenced data 625, a score of 0 indicates that, for example, the vegetation characteristic for the mowable area matches the least desirable vegetation characteristic measured among the other mowable areas. In this regard, the server transforms each measured vegetation characteristic into a vegetation characteristic score normalized to have a value between 0 and 100, where 0 corresponds to the least desirable score (e.g., least desirable) and 100 corresponds to the most desirable score (e.g., most desirable).

Figure 12A:
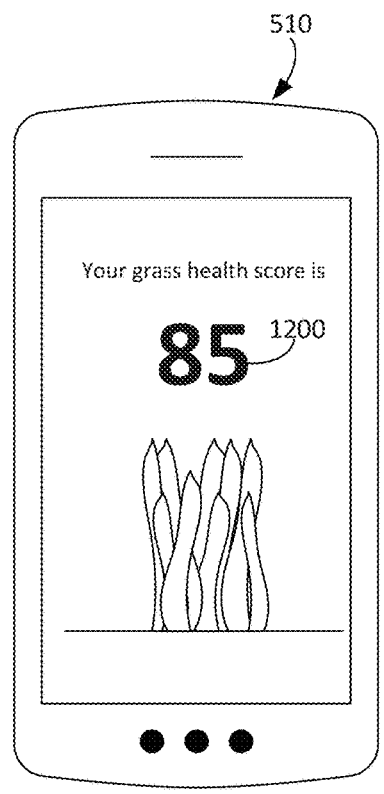
FIG. 12A depicts the user device displaying a grass health score.

In some examples, the server averages the normalized scores computed for each of the vegetation characteristics to obtain the grass health score. At operation 1135, the server communicates the grass health score to the user device. The server sends user interface data to the remote device to cause the remote device to display the grass health score. As shown in FIG. 12A, the user device 510 displays a grass health score 1200 computed from the average of the normalized scores from each of the vegetation characteristics represented in the position-referenced data 625. In some examples, the user device 510 further displays the normalized average score computed for each of the vegetation characteristics, as computed in operation 1130 of FIG. 11. Thus, the user device 510 is able to display individual scores for the color, the grass height, and the moisture content of the vegetation of the mowable area.

The user device 510 provides information to the user that informs the user of the performance of the mowable area relative to the other mowable areas. At operation 1140 of FIG. 11, the server computes other grass health scores of the other mowable areas associated with other robotic lawnmowers. The other mowable areas are, for example, mowable areas within the vicinity of the mowable area (e.g., geographically close the mowable area). In some examples, the other mowable areas are mowable areas with robotic lawnmowers within a predetermined distance between 10 kilometers and 1000 kilometers. In some examples, the other mowable areas are all mowable areas within a county, district, or other geographical boundary.

Figure 12B:
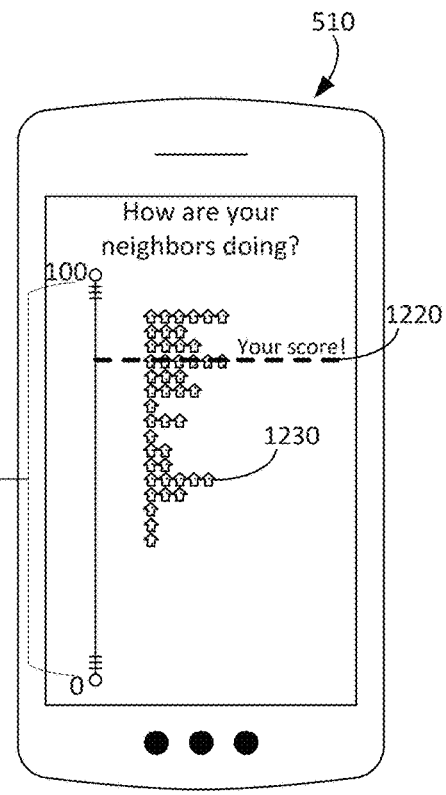
FIG. 12B depicts the user device displaying a grass health score comparison.

At operation 1145, the server compares the grass health score of the mowable area to the other grass health scores of the other mowable areas. The server then, at operation 1150, communicates the comparison to the user device. The user device receives user interface data to display a representation of the comparison. As shown in FIG. 12B, the user device 510 displays a bar graph 1210 of the grass health score of the mowable area alongside the grass health scores of the other mowable areas. The bar graph 1210 includes an indicator 1220 for the grass health score of the user's mowable area as well as icons 1230 representing the grass health scores for each of the other mowable areas. The grass health scores of the other mowable areas are placed into numeric buckets to simplify representation of the bar graph 1210. The bar graph 1210 provides a visual representation of the lawn care performance of the mowable area as compared to other mowable areas. The user easily sees how healthy, aesthetically pleasing, or efficiently maintained the mowable area relative to other mowable areas.

In some implementations, the grass health score accounts for geographic variations. Some geographical areas experience different climate such that one geographical area has vegetation with significantly higher moisture content (or greener vegetation or faster grass growth) than another geographical area. The grass health score are adjusted such that differences between the geographical areas do not affect the grass health score.

In some implementations, the baseline data for the grass health score also changes throughout the year such that during each season, different baseline data is used. For example, the baseline data during summer months indicates browner vegetation with lower moisture content, while baseline data for spring and autumn months indicates greener vegetation with higher moisture content.

In addition to using the position-referenced data to generate user interface data to cause the user device to display grass health information pertaining to the mowable area, the electronic processor receives information pertaining to fluctuating weather conditions in the mowable area to provide control operations of the robotic lawnmower. In some examples, the electronic processor uses the communication system of the lawnmower to receive the information from the server or other appropriate remote system that receives, updates, stores, and transmits the information pertaining to the fluctuating weather conditions.

Figure 13:
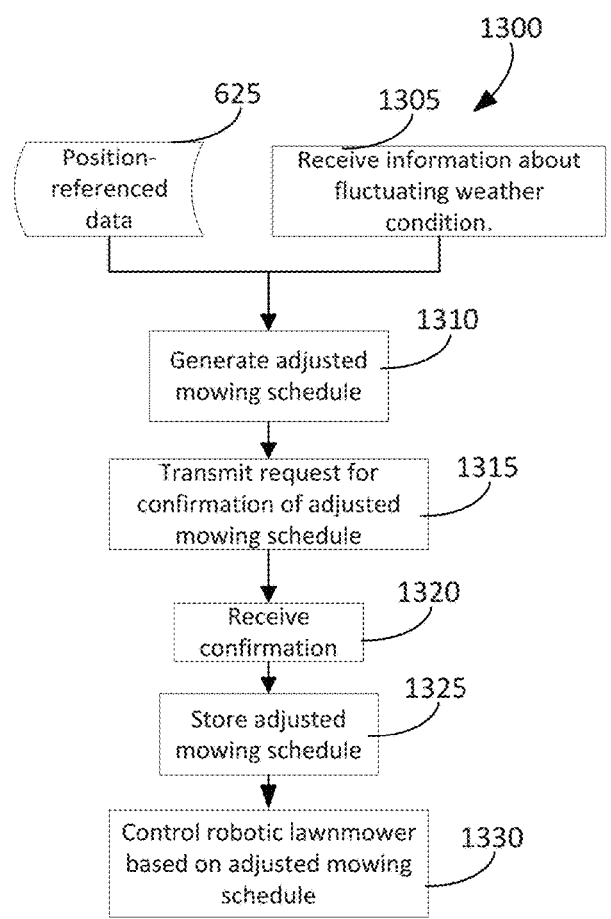
FIG. 13 is a flow chart of a process using position-referenced data and a fluctuating weather condition to adjust a mowing scheduled and control the robotic lawnmower using the adjusted mowing schedule.

The flow chart of FIG. 13 depicts a process 1300 in which the electronic processor uses the information about the fluctuating weather condition to control the robotic lawnmower. At operation 1305, the electronic processor receives, using the wireless receiver of the communications system of the lawnmower, information about fluctuating weather conditions at the mowable area. The fluctuating weather conditions include, for example, past weather conditions, including day-to-day temperatures, amount of precipitation, humidity, and other relevant weather conditions at the mowable area. In some cases, the fluctuating weather conditions also include present weather conditions, including current temperatures and precipitation events at the mowable area. Alternatively or additionally, the fluctuating weather conditions further includes forecasted weather conditions, including predicted temperatures and likelihoods for precipitation.

At operation 1310, the electronic processor generates an adjusted mowing schedule based on the position-referenced data 625 and the fluctuating weather conditions received at the operation 1305. As described herein, the electronic processor uses the mowing schedule stored in lawnmower memory to control the robotic lawnmower to mow. The mowing schedule is generated and adjusted according to the recommendations provided by the electronic processor as part of the processes 600 and 800 (e.g., recommendations to increase or decrease mowing frequency, of FIGS. 6 and 8). For the operation 1310, the electronic processor generates an adjusted mowing schedule based on the position-referenced data representing the vegetation characteristic and the current mowing schedule. As explained with respect to FIG. 7C, the position-referenced data represents, for example, the level of power expended to drive the grass cutter of the robotic lawnmower at various locations throughout the mowable area, which is proportional to the grass height. The adjusted mowing schedule accounting for the position-referenced data considers variations in vegetation characteristics in the mowable area and power expended to drive the grass cutter. In some cases, the electronic processor has previously generated the current mowing schedule based on the position-referenced data. The adjusted mowing schedule is thus based on both the position-referenced data and the fluctuating weather conditions.

In some cases, the electronic processor adjusts the mowing schedule based on past weather conditions. For example, rain or precipitation events within a few days (e.g., 3 to 7 days) in the past can cause an increased rate of grass and vegetation growth. The electronic processor accordingly, based on the past rain and precipitation events, increases the frequency of mowing operations in the mowing schedule.

The electronic processor also decreases mowing operations in some implementations due to lack of precipitation events for an extended period of time (e.g., a drought). In some cases, the electronic processor receives indication of pending snow or decreasing temperatures indicative of the winter season. In some examples. The electronic processor decreases mowing frequency based on the indication and provide a recommendation to place the robotic lawnmower in storage until the winter passes.

In some examples, the electronic processor adjusts the mowing schedule based on expected weather conditions. For example, the electronic processor adjusts the mowing schedule based on an expected rainfall at the mowable area. To avoid controlling the robotic lawnmower to execute a mowing operation during rainfall the electronic processor adjusts the mowing schedule such that the robotic lawnmower does not execute a mowing operation during times in the future having expected rainfall. The rainfall can saturate the soil such that the robotic lawnmower is more likely to cause ruts due to lower cohesiveness caused by the entrained water from the rainfall.

Figure 14:
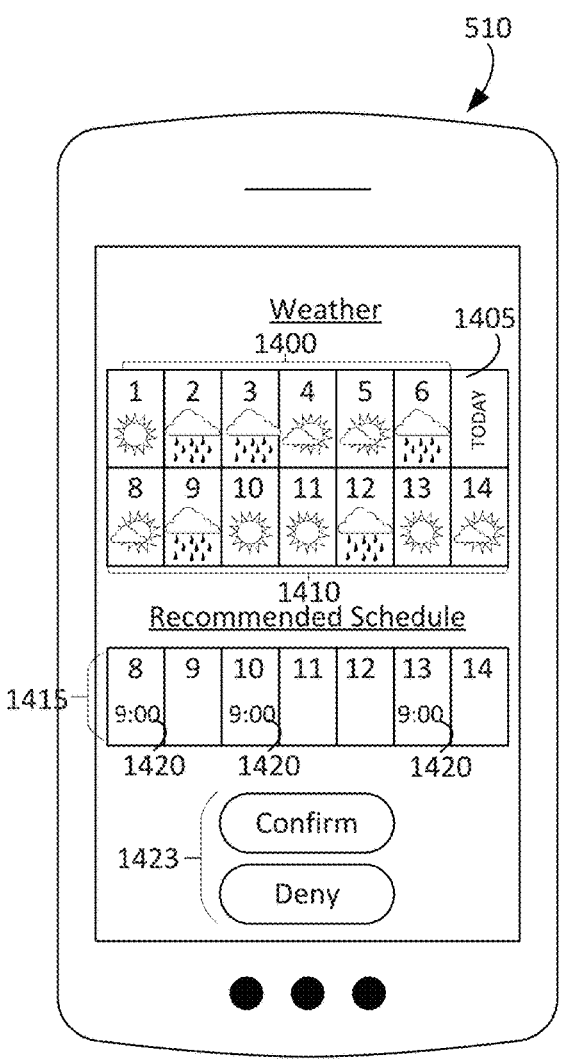
FIG. 14 depicts the user device displaying the fluctuating weather condition and a recommended mowing schedule.

At operation 1315, the electronic processor 415 sends user interface data to cause the user device to display the adjusted mowing schedule. As part of operation 1315, the electronic processor 415 forwards information about the fluctuating weather condition to cause the user device to also display the fluctuating weather condition. In some cases, the user interface data also causes the user device to display a request to confirm implementation of the adjusted mowing schedule. As shown in FIG. 14, the user interface data causes the user device 510 to display past weather 1400 (e.g., on the $1^{st}$ through $6^{th}$ days of the month) before today's date 1405 (e.g., the 7th day of the month) and forecasted weather 1410 (e.g., on the $8^{th}$ through $14^{th}$ days of the month) after today's date 1405. The request further causes the user device 510 to display an adjusted mowing schedule 1415 that shows future dates with start times 1420 for mowing operations. The user invokes confirm/deny buttons 1423 to confirm or deny the adjustment to the mowing schedule recommended by the electronic processor.

The adjusted recommended mowing schedule 1415 accounts for the fluctuating weather conditions at the mowable area. Due to the past rain of the past weather 1410 that occurred recently on the $2^{nd}$, $3^{rd}$, and $6^{th}$ days of the month, the electronic processor generated the adjusted mowing schedule 1415 that has a mowing frequency of every two days. As such, the adjusted mowing schedule 1415 recommends a mowing operation on the $8^{th}$ and the $10^{th}$ days of the month. Due to forecasted weather on the $9^{th}$ and $12^{th}$ days of the month, the electronic processor 415 generated the adjusted mowing schedule 1415 to not include start times 1420 on those days.

In some implementations, the adjusted recommended mowing schedule 1415 accounts for excessive rainfall beyond a certain threshold amount (e.g., centimeters of rainfall) that indicates a likelihood of flooding. The electronic processor decreases mowing frequency such that the robotic lawnmower does not damage the mowable area by performing a mowing operation when the soil conditions are susceptible to damage due to softness of the soil.

In some implementations, the adjusted recommended mowing schedule 1415 also accounts for increases in power expended by the grass cutter that indicates faster grass growth or higher grass heights. The electronic processor increases the mowing frequency so that the robotic lawnmower expends less power during each of its travels across the mowable area. In some cases, the electronic processor waits for a prompt from the user device 510 before adjusting the mowing schedule stored in system memory. If the user confirms implementation of the adjusted mowing schedule 1415, the user device 510 sends the prompt indicating the confirmation of the adjusted mowing schedule 1415 to the electronic processor of the lawnmower. At operation 1320 of FIG. 13, the electronic processor receives from the user device the confirmation of the adjusted mowing schedule 1415. Upon receiving the confirmation, at operation 1325, the electronic processor stores the adjusted mowing schedule 1415. The electronic processor replaces the current mowing schedule stored in memory with the adjusted mowing schedule 1415.

The adjusted mowing schedule 1415 thus indicates the start times 1420 of mowing operations for the robotic lawnmower. At operation 1330 of FIG. 13, the electronic processor, based on the adjusted mowing schedule, controls the robotic lawnmower. Outside of the schedule start times, the electronic processor keeps the robotic lawnmower in an idle mode. When an internal clock operable with the electronic processor indicates that the current time is a scheduled start time, the electronic processor activates the robotic lawnmower and cause the robotic lawnmower to mow the mowable area.

The electronic processor also proposes adjusted mowing schedules based on temperatures in some implementations. For example, the electronic processor selects start times that avoid mowing operations during high temperatures (e.g., greater than 40 degrees Celsius). While the mowing schedules have been defined in terms of start times, in some cases the electronic processor generates and recommends mowing schedules with start times and durations. The electronic processor decreases mowing event durations during periods of time when the temperature is high, to avoid overheating the robotic lawnmower. In some cases, the electronic processor causes the robotic lawnmower to mow portions of the mowable area at different times during the day to avoid long durations of mowing operations. As a result, the electronic processor generates schedules that have durations between, for example, 30 and 90 minutes.

The fluctuating weather conditions can also include emergency conditions—such as, for example, snowstorms, tornados, blizzards, or hurricanes—that can cause damage to the robotic lawnmower. The electronic processor adjusts the mowing schedule so that the robotic lawnmower does not perform mowing operations during emergency conditions.

In some implementations, the electronic processor receives an irrigation schedule associated with an automated irrigation system. The electronic processor adjusts the mowing schedule such that the robotic lawnmower is not running when the irrigation system is dispensing water into the mowable area. In some implementations, the user manually enters the irrigation schedule using the user interface of the robotic lawnmower or of the user device.

While the vegetation characteristics have been described to be grass height, color, and moisture content, other vegetation characteristics can also be detected and used to control mowing operations of the robotic lawnmower. In some examples, the robotic lawnmower detects a combination of power expended by the grass cutter and a grass height to determine the density of grass in an area.

In some implementations, the user manually includes scheduling requirements for the mowing schedule. In some cases, the user indicates that the robotic lawnmower should not perform mowing operations during one or more days or times during the week. In some cases, the user manually indicates that the robotic lawnmower should not perform mowing operations due to certain weather conditions, such as temperatures exceeding a threshold temperature or rainfall totals above a certain amount.

The robotic lawnmowers described herein can be controlled, at least in part, using one or more computer program products, e.g., one or more computer programs tangibly embodied in one or more information carriers, such as one or more non-transitory machine-readable media (e.g., memory 420), for execution by, or to control the operation of, one or more data processing apparatus (e.g., electronic processor 415, a programmable processor, a computer, multiple computers, and/or programmable logic components).

A computer program can be written in any form of programming language, including compiled or interpreted languages, and it can be deployed in any form, including as a stand-alone program or as a module, component, subroutine, or other unit suitable for use in a computing environment.

Operations associated with controlling the robotic lawnmowers described herein can be performed by one or more programmable processors (e.g., electronic processor 415) executing one or more computer programs to perform the functions and processes described herein. Control over all or part of the robotic lawnmowers described herein can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method of mowing with an autonomous robot lawnmower, the method, comprising:

receiving information about a fluctuating weather condition related to a mowable area;

transmitting data to a remote user device to cause the remote user device to display information indicative of a recommendation to adjust a mowing schedule based on the information about the fluctuating weather condition;

in response to receiving, from the remote user device, a user confirmation to adjust the mowing schedule, adjusting the mowing schedule; and controlling the autonomous robot lawnmower to mow the mowable area based on the adjusted mowing schedule.

2. The method of claim 1, wherein:
the information about the fluctuating weather condition comprises information about a forecast of weather at the mowable area, and
transmitting the data to the remote user device to cause the remote user device to display the information indicative of the recommendation to adjust the mowing schedule based on the information about the fluctuating weather condition comprises transmitting the data to the remote user device to cause the remote user device to display the information indicative of the recommendation to adjust the mowing schedule based on an expected rainfall at the mowable area.

3. The method of claim 1, further comprising determining a vegetation characteristic of the mowable area based on sensor data from a vegetation characteristic sensor on the autonomous robot lawnmower, the vegetation characteristic sensor being configured to generate the sensor data in response to detecting the vegetation characteristic, the vegetation characteristic being selected from the group consisting of a moisture content, a grass height, and a color,
wherein transmitting the data to the remote user device to cause the remote user device to display the information indicative of the recommendation to adjust the mowing schedule based on the information about the fluctuating weather condition further comprises transmitting the data to the remote user device to cause the remote user device to display the information indicative of the recommendation to adjust the mowing schedule based on the fluctuating weather condition and the determined vegetation characteristic.

4. The method of claim 1, further comprising determining a level of power expended to drive a cutter of the autonomous robotic lawnmower robot,
wherein transmitting the data to the remote user device to cause the remote user device to display the information indicative of the recommendation to adjust the mowing schedule based on the information about the fluctuating weather condition comprises transmitting the data to the remote user device to cause the remote user device to display the information indicative of the recommendation to adjust the mowing schedule based on the fluctuating weather condition and the determined level of power expended to drive the cutter of the autonomous robotic lawnmower.

5. The method of claim 1, further comprising, prior to adjusting the mowing schedule:
waiting for a prompt from a remote user device before adjusting the mowing schedule.

6. The method of claim 5, further comprising transmitting the information about the fluctuating weather condition to the remote user device, wherein waiting for the prompt from the remote user device before adjusting the mowing schedule comprises waiting for the prompt after transmitting the information about the fluctuating weather condition to the remote user device.

7. The method of claim 1, wherein receiving the information about the fluctuating weather condition comprises receiving the information about the fluctuating weather condition from a remote computing system via a wireless receiver of the autonomous robotic lawnmower.

8. The method of claim 1, wherein the fluctuating weather condition comprises a temperature, an amount of precipitation, or a humidity.

9. The method of claim 1, wherein the fluctuating weather condition comprises a forecasted weather condition.

10. The method of claim 1, wherein the fluctuating weather condition comprises a past precipitation event, and adjusting the mowing schedule comprises increasing a frequency of mowing operations.

11. The method of claim 1, wherein the fluctuating weather condition comprises a forecasted precipitation event, and adjusting the mowing schedule comprises adjusting the mowing schedule such that the autonomous robotic lawnmower does not execute a mowing operation during the forecasted precipitation event.

12. The method of claim 1, wherein the fluctuating weather condition comprises an emergency condition, and adjusting the mowing schedule comprises adjusting the mowing schedule such that the autonomous robotic lawnmower does not execute a mowing operation during the emergency condition.

13. A method of controlling an autonomous robotic lawnmower to mow a mowable area, the method comprising:
presenting, by a user device, a recommended mowing schedule for the autonomous robotic lawnmower, the recommended mowing schedule selected based on information about a fluctuating weather condition;
receiving, by the user device, a user confirmation of the recommended mowing schedule; and
transmitting, by the user device, data to cause a mowing schedule for the autonomous robotic lawnmower to be adjusted in accordance with the recommended mowing schedule such that the autonomous robotic lawnmower is controlled based on the recommended mowing schedule.

14. The method of claim 13, wherein:
the information about the fluctuating weather condition comprises information about a forecast of weather at the mowable area, and
the method further comprises presenting, by the user device, information indicative of the forecast of weather at the mowable area, the information indicative of the forecast of weather at the mowable area being indicative of an expected rainfall for the mowable area.

15. The method of claim 13, further comprising presenting, by the user device, the information indicative of the fluctuating weather condition.

16. The method of claim 15, wherein the fluctuating weather condition comprises a temperature, an amount of precipitation, or a humidity.

17. The method of claim 15, wherein the fluctuating weather condition comprises a forecasted weather condition.

18. An autonomous robotic lawnmower comprising:
a drive system operable to navigate the autonomous robotic lawnmower across a mowable area;
electronic memory; and
a controller configured to execute instructions to perform operations comprising
transmitting data to a remote user device to cause the remote user device to display information indicative of a recommendation to adjust a mowing schedule based on information about a fluctuating weather condition,
in response to receiving, from the remote user device, a user confirmation to adjust the mowing schedule, storing, in the electronic memory, the adjusted mowing schedule, and
performing one or more mowing operations to mow the mowable area in accordance with the adjusted mowing schedule.

19. The autonomous robot lawnmower of claim 18, wherein:
the information about the fluctuating weather condition comprises information about a forecast of weather at the mowable area, and
transmitting the data to the remote user device to cause the remote user device to display the information indicative of the recommendation to adjust the mowing schedule based on the information about the fluctuating weather condition comprises transmitting the data to the remote user device to cause the remote user device to display the information indicative of the recommendation to adjust the mowing schedule based on an expected rainfall at the mowable area.

20. The autonomous robot lawnmower of claim 18, wherein the autonomous robot lawnmower further comprises a vegetation characteristic sensor configured to generate sensor data indicative of a vegetation characteristic being selected from the group consisting of a moisture content, a grass height, and a color,
wherein transmitting the data to the remote user device to cause the remote user device to display the information indicative of the recommendation to adjust the mowing schedule based on the information about the fluctuating weather condition further comprises transmitting the data to the remote user device to cause the remote user device to display the information indicative of the recommendation to adjust the mowing schedule based on the fluctuating weather condition and the vegetation characteristic.

21. The autonomous robot lawnmower of claim 18, wherein the operations further comprise waiting for a prompt from a remote user device before the mowing schedule is adjusted.

22. The autonomous robot lawnmower of claim 21, wherein the operations further comprise transmitting the information about the fluctuating weather condition to the remote user device, wherein waiting for the prompt from the remote user device before the mowing schedule is adjusted comprises waiting for the prompt after transmitting the information about the fluctuating weather condition to the remote user device.

* * * * *

UNITED STATES PATENT AND TRADEMARK OFFICE
CERTIFICATE OF CORRECTION

PATENT NO. : 10,785,907 B2
APPLICATION NO. : 16/037090
DATED : September 29, 2020
INVENTOR(S) : Brian Doughty et al.

Page 1 of 1

It is certified that error appears in the above-identified patent and that said Letters Patent is hereby corrected as shown below:

In the Claims

Column 28, Line 57, in Claim 1, delete "method," and insert -- method --, therefor.

Column 29, Line 37, in Claim 4, delete "lawnmower robot," and insert -- lawnmower, --, therefor.

Signed and Sealed this
Twenty-ninth Day of December, 2020

Andrei Iancu
*Director of the United States Patent and Trademark Office*